(12) United States Patent
Hipp

(10) Patent No.: US 7,787,105 B2
(45) Date of Patent: Aug. 31, 2010

(54) TAKING DISTANCE IMAGES

(75) Inventor: Johann Hipp, Hamburg (DE)

(73) Assignee: Triple-IN Holding AG, Zug (CH)

( * ) Notice: Subject to any disclaimer, the term of this patent is extended or adjusted under 35 U.S.C. 154(b) by 256 days.

(21) Appl. No.: 11/854,902

(22) Filed: Sep. 13, 2007

(65) Prior Publication Data

US 2008/0186470 A1 Aug. 7, 2008

(30) Foreign Application Priority Data

Sep. 15, 2006 (EP) .................................. 06019388

(51) Int. Cl.
*G01C 3/06* (2006.01)
(52) U.S. Cl. ..................................... 356/5.03
(58) Field of Classification Search ................. 356/5.03
See application file for complete search history.

(56) References Cited

U.S. PATENT DOCUMENTS

| 4,299,484 | A | 11/1981 | Holzapfel | |
|---|---|---|---|---|
| 4,586,043 | A | 4/1986 | Wolf | |
| 6,404,506 | B1 * | 6/2002 | Cheng et al. | 356/634 |
| 2001/0012104 | A1 | 8/2001 | Dunne | |
| 2004/0135992 | A1 | 7/2004 | Munro | |
| 2007/0091294 | A1 * | 4/2007 | Hipp | 356/4.01 |

FOREIGN PATENT DOCUMENTS

| CN | 1374503 | 10/2002 |
|---|---|---|
| DE | 4124192 | 1/1993 |
| DE | 19637010 | 5/1997 |
| DE | 19703633 | 8/1998 |
| DE | 10010212 | 9/2001 |
| EP | 1 522 870 | 4/2005 |

OTHER PUBLICATIONS

European Search Report dated Apr. 24, 2007, European Application No. 06 019 388.5. 14 pages.
Myllyla et al, Imaging Distance Measurements using TOF Lidar, University of Oulu, Department of Electrical Engineering and Infotech, Oct. 1, 1997, 6 pages.
F.E. Nathanson et al.: Radar Design Principles, 1991, Scitech Publishing, Inc. XP002272505, pp. 80-83.

* cited by examiner

*Primary Examiner*—Thomas H Tarcza
*Assistant Examiner*—Luke D Ratcliffe
(74) *Attorney, Agent, or Firm*—Gifford, Krass, Sprinkle, Anderson & Citkowski, P.C.

(57) ABSTRACT

A system and method for the taking of a large number of distance images having distance picture elements. Electromagnetic radiation is transmitted in the form of transmission pulses at objects, and reflected echo pulses are detected. Measurements are made by determining the pulse time of flight of the distances of objects which respectively form a distance picture element and at which the transmission pulses are reflected. A time measuring device carries out a plurality of associated individual measurements for each distance image to be taken. Stored event lists of all time measuring channels are read out and evaluated in order to convert the respective time information contained in the event lists into distance values corresponding to the distance picture elements.

67 Claims, 13 Drawing Sheets

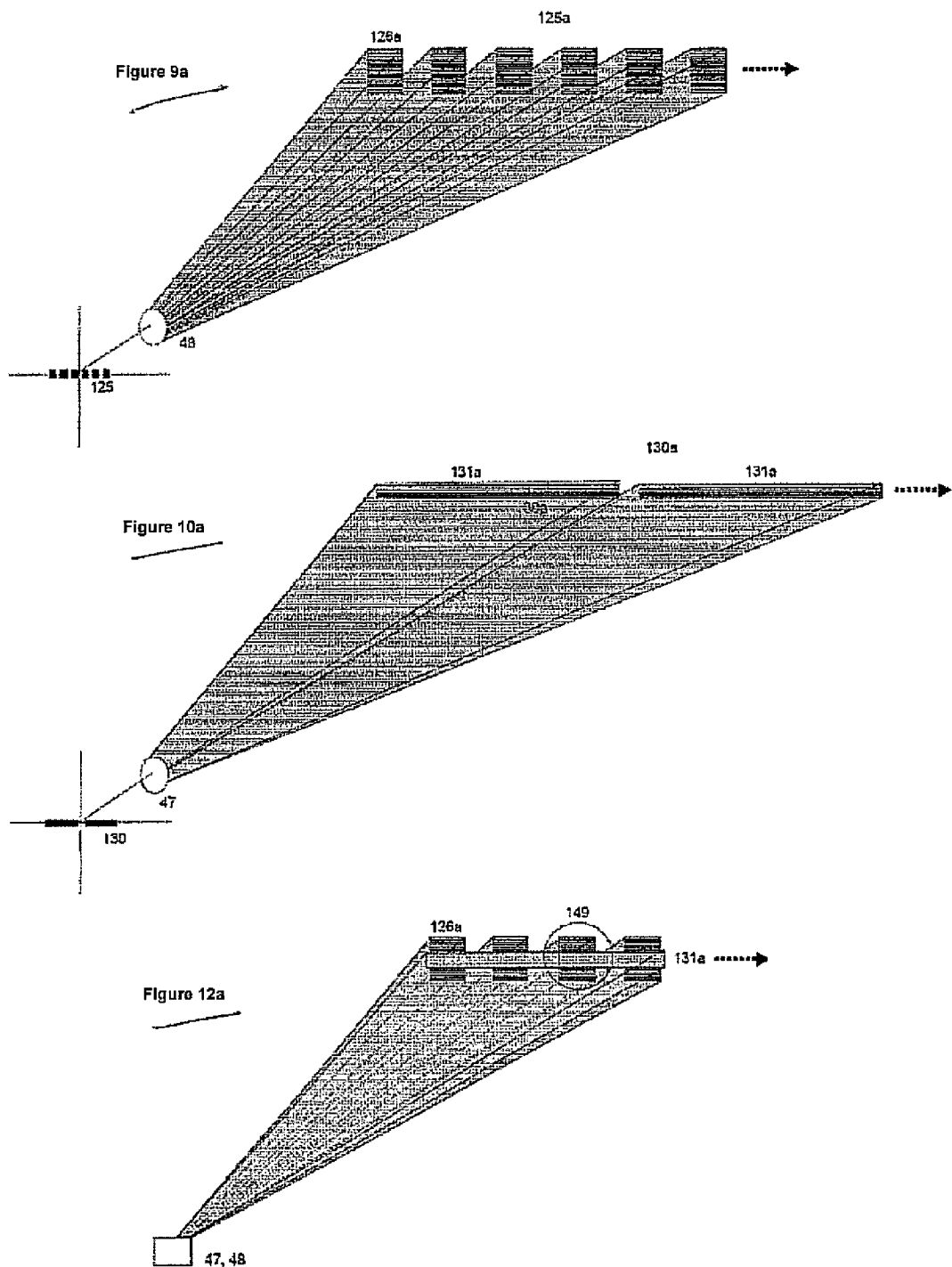

TAKING DISTANCE IMAGES

CROSS-REFERENCE TO RELATED APPLICATIONS

This application claims priority of European Patent Application No. 06 019 388.5 filed Sep. 15, 2006.

FIELD OF THE INVENTION

The invention relates to a method and to an apparatus for the taking of distance images comprising a large number of distance picture elements in accordance with the independent claims 1 and 34. The invention furthermore relates to an IC module having a time measuring device in accordance with claim 64 for the carrying out of the method in accordance with the invention and/or for the apparatus in accordance with the invention.

BACKGROUND OF THE INVENTION

"Distance images" are here not only to be understood as two-dimensional arrangements of distance picture elements, but also one-dimensional arrangements, also called profiles, i.e. distance images which each include a single row of distance picture elements disposed next to one another.

It is the object in distance measurement to measure the time between the transmission of pulsed electromagnetic radiation, here briefly called "signal" or "signal pulses", and the arrival of the signal pulses reflected by targets as so-called "echo pulses". These times can be converted into distances from the reflecting target due to the constant nature of the propagation speed of electromagnetic radiation. There are a number of embodiments of devices which satisfy this object which are here designated by the collective term "pulse TOF sensors". TOF means "time of flight" and here designates the time which a signal pulse requires to the target and back.

Existing sensors generally (cf. also FIGS. 1 to 6) have
  transmitters (15) with which the pulse of the electromagnetic radiation (14) is generated, such as a pulse laser (15) comprising a pulse laser diode (10) and a current pulser (11) for the generation of an optical pulse (14)
  receivers (8) for the detection of the reflected signal pulses, such as receivers for light pulses comprising a photodiode or APD (avalanche photodiode) (2), a broadband amplifier (3) and a comparator (4) whose reference (5) is larger than 4.5 NEP of the noise of the analog output signal to reliably avoid the detection of noise pulses ("NEP" means "noise equivalent power" here—that power which corrects to the effective value of the noise),
  a time measurement circuit with which the digitized, i.e. converted into a digital signal by means of a comparator, start pulses and echo pulses which belong together are converted into logical pulses or gate pulses which are either
    a. converted directly into voltage signals using TACs (time to analog converters), with this voltage subsequently being converted into a digital value using ADCs (analog to digital converters), or which
    b. are used for the gating of an accurate measurement clock signal with a subsequent counting of the positive flanks of the measurement clock signal falling in the gate pulse, with the count representing the digital value of the TOF, or
    c. which are used for the gating of the measurement clock signal with a subsequent counting of the positive flanks of the measurement clock signal falling in the gate pulse and are additionally used for the derivation of 2 TP pulses (TP=part period), with the TP pulse widths being converted into a digital value using TACs and a subsequent analog to digital conversion and the TOF being assembled from the part values, or
    d. which are used for the gating of the measurement clock signal with a subsequent counting of the positive flanks of the measurement clock signal falling in the gate pulse and are additionally used for the derivation of 2 TP pulses, with the TP pulse widths being converted into a digital number using TDCs and the TOF being assembled from the part values.

The time measurement circuits or parts thereof are configured in a number of cases as an integrated "time measurement IC" due to the required switching speeds and complexity. Since a signal pulse can impact on a plurality of targets disposed sequentially so that a plurality of echo pulses enter into the time measurement circuit with different respective TOFs, their associated gate widths have to be measured. In some time measurement circuits, the occurrence of multiple echoes is taken into account in that at least the TOFs belonging to two echo pulses are measured using two time measurement circuits connected in parallel (double pulse evaluation).

These simple sensors have been extended to 2D sensors with the aid of a mirror scanner or to 3D sensors with the aid of two mirror scanners arranged perpendicular to one another, with 2D or 3D distance images then being able to be taken with them. Distance images are created in that a distance, and optionally a power, and not a color and a brightness as with images taken with CCD cameras, for example, is associated with each picture element (spatial angular segment of a larger spatial angle comprising an array of spatial angular segments).

Existing sensors are generally limited in their speed of taking the measured value by the maximum pulse repetition rate of the laser modules used. With pulse lasers having pulse laser diodes which have a power of some 10 watts required for the distance measurement of some 100 m, the pulse repetition rate is limited at around 20 to 30 kHz so that the taking of 2D or 3D distance images can only take place very slowly (with a few Hz) using these sensors. This is very slow in comparison with purely imaging sensors such as CCD cameras and is not suitable for the detection of dynamic processes within the spatial angle taken.

The sensitivity of existing pulse TOF sensors is generally >4.5 NEP of the noise due to the required avoidance of noise pulses.

An increase in the sensitivity above 4.5 NEP could generally be achieved in that the analog signal of the receiver was digitized by means of an ACD (analog-digital converter) with a high scanning rate. If the measurements are repeated and if the analog/digitally converted signals of the measurements are averaged, the noise would reduce by the square root of the averaging depth, whereas the signal pulses would be maintained at the same magnitude. The signal-to-noise ratio thereby improves proportionally to the square root of the averaging depth, which would generally correspond to an increase in sensitivity, provided a measuring time sufficient therefor would be available. However, the technical effort is enormous because the conversion rate has to be at some GHz and the computing effort for the averaging is necessarily proportional thereto. For this reason, sensors of this type have not achieved any importance in the market so that the sensitivity limit of today's pulse TOF sensors is generally larger than/equal to 4.5 NEP.

Disadvantages of the State of the Art of Today's Pulse TOF Sensors

It is therefore a disadvantage of the prior art that the sensitivity (minimal signal-to-noise ratio) is limited to larger than/equal to 4.5 NEP since no noise pulses may be detected because they would be confusable with echo pulses and would falsify the result;

only one echo pulse, in rare cases two echo pulses, can be processed during the TOF and so reflections from rain, snow, fog or from the dirty termination glass of the sensor or from a plurality of impacted targets cannot be evaluated within a TOF or even make the measurement impossible, so that external applications for pulse TOF sensors can only be realized with great limitations;

no parallel processing of a plurality of signal pulses or parts of a signal pulse is possible;

no larger number of pulses such as noise pulses which generally occur increasedly at a low selection of the comparator threshold during the TOP can be measured with existing time measurement circuits;

no 2D distance image taking (profile) is possible without a scanner with movable mirrors;

a 3D distance image talking is only possible with two scanners with movable mirrors;

no sufficient speed for a 2D or a 3D distance image talking can be achieved.

Furthermore, electronic cameras, predominately cameras with CCD chips as an areal sensor element, are known and have long been in use for digital image taking. These cameras are capable of supplying both static recordings ("images") and continuous recordings ("moving images") at high quality, in high resolution and at a sufficient speed and therefore have achieved an extraordinary product variety and product dissemination.

There are thus distance cameras in which a modified CCD chip is used for the distance measurement for each picture element in that a strong light pulse is transmitted and the reflected signal is integrated in the individual picture element sensors and the integration is interrupted at a suitable point in time so that a distance dependent charge amount is stored in each picture element sensor. Only very small ranges can be achieved with these sensors with a very large power and averaging effort so that they represent a poor compromise for all demands, with the exception of the lateral resolution.

It is desirable in many cases to obtain the information of distance and signal power in addition to the pure image information consisting of color and brightness per picture element. Such an "image", which contains the information of distance and power per picture element, is called a distance image in the following. The type of sensors for which improved apparatus should be set forth in accordance with the invention in particular includes apparatus for continuous digital 2D and 3D distance image taking. In the following, a 2D distance image will also be called a "distance profile".

The information of the distance images naturally consists of arrays of numbers. The position of the value in the array represents the angles of the distance picture element in a polar or spherical coordinate system so that the angles do not have to be indicated separately. In addition, the resolution and the type of the composition of the distance image must be known. A distance image can only be made visible for humans by stratagems such as the association of distances with colors. However, it takes considerably more effort to take the distance information as digital values from one or two images taken stereoscopically, and the accuracy worsens as the distance from the imaged objects increases. Since any controls, automation apparatus or measurement systems which process geometrical distance values require distances as digital values, there is a need for apparatus for the talking of distance images.

When taking distance images, in particular a restriction to the distance measurement by means of short pulses of electromagnetic radiation whose time of flight to a reflecting object and back is measured takes place in accordance with the invention. As already mentioned, this method is called "pulse TOF measurement". This technique has the advantage that distances can be measured with it with a large working range and fast with an error which is dependent on the distance and low.

The simple sensors available today have been extended to 2D sensors with the aid of a mirror scanner or to 3D sensors with the aid of two mirror scanners arranged perpendicular to one another, with 2D or 3D distance images then generally being able to be taken with them. With existing sensors, the measuring speed is generally limited by the maximum pulse repetition rate of the laser modules used. Furthermore, the mechanical strain on the mirror scanners is very high because the total number of deflections per second is equal to the product of the column and line numbers and the repetition rate of the distance image. Generally, this is well above the mean repetition rate of the transmitters used so that existing sensors are not suitable for the taking of distance images for the named reasons alone.

It is problematic with the pulse TOF sensors known today that one or more of the following disadvantages and of the disadvantages already mentioned above is present in all sensors or measuring systems in existence today, namely that:

no sufficient speed for a 2D and 3D taking of distance images can be achieved, or at best only in very slow operation;

the mirror scanners are exposed to a high mechanical strain;

the suitability for outside applications is very limited.

Furthermore, for the generation of distance images, there are stereoscopic camera systems in which there is the possibility with two cameras whose optical axes have a base spacing to determine the distances in the picture elements by correlation. These systems suffer from a high calculation effort and from an error which increases considerably with the distance so that they only appear suitable in a very restricted application area;

triangulation systems in which a laser line is scanned over an object and is measured by means of a CCD camera. The distance profile can be calculated from the displacement of the lines. These systems have a low range and a measurement error which increases with the distance;

radar systems with which e.g. aircraft in space are measured for the purpose of air traffic control or tracking or ships are measured at sea for purposes of position tracking. These systems are, however, also only limited in their application to these cases due to the low radiation frequency used, which causes a low lateral resolution, and due to the long time of flight of the signals, so that practically no further applications have resulted.

The present state of the art of the distance image generation can therefore be classified as insufficient.

In this connection, reference is made with respect to the prior art to the European patent application EP 1 522 870 (hereinafter KEM) which relates to a method and an apparatus for distance measurement. The invention makes at least partial use of the principle described in KEM. To avoid repetition, reference is herewith made to the disclosure content of the said EP 1 522 870 with respect to the KEM principle and the content of EP 1 522 870 is incorporated by reference in the present application.

SUMMARY OF THE INVENTION

It is the object of the invention to set forth a possibility with which the said disadvantages of the prior are of current pulse TOF sensors for image talking can be overcome. The cutting of the effort in material and time for the considerable increase in sensitivity, the increase in measuring speed on taking 2D and 3D distance images, the provision of the performance capability of pulse TOF sensors in each distance picture element, the increase in the range and the avoidance of an error independent of the distance should in particular be achieved.

This object is satisfied by the features of the independent method claim 1 and by the features of the independent apparatus claim 34.

Preferred embodiments of the invention are set forth in the independent claims whose content is herewith incorporated in the description by reference.

The invention in general and in particular in its preferred aspects makes the following functions possible inter alia:

With a suitable time measurement circuit, a parallel processing of start pulses of a plurality of lasers and of signal and noise pulses of a plurality of receivers in a plurality of time measuring channels arranged in parallel to significantly increase the measuring rate.

With a suitable time measurement circuit and transmitter and receiver arrays, a 2D distance image taking by parallel and serial time measurement in parallel time measuring channels without moving parts (mirror scanners).

With a suitable time measurement circuit and transmitter and receiver arrays, a 3D distance image taking with only one mirror scanner by parallel and serial time measurement in parallel time measuring channels.

Overall, the achieving of a sufficient speed and sensitivity in 2D and 3D distance image taking.

With a suitable time measurement circuit, measurements of a large number of pulses in each time measuring channel which occur during the TOF such as start pulse, echo and noise pulses. The noise pulses unavoidably occur on a low selection of the comparator threshold (5) of the comparator (4) connected after the receiver amplifier and must also be measured to be able to achieve a sensitivity much smaller than 4.5 NEP by a suitable averaging of measurements.

Processing of a number of echo pulses during the TOF to be able to evaluate reflections both from e.g. rain, snow, fog and a contaminated termination plate and from multiple targets in each time measuring channel, that is to permit external measurements under poor weather conditions or also to detect these problems in a metrological manner.

Measurement of a number of echo pulses with a simultaneous sensitivity increase (on the presence of noise pulses) to increase the range, i.e. to measure a number of echo pulses and a number of noise pulses simultaneously in a number of time measuring channels.

Reduction of the mechanical load of mirror scanners by the parallel processing of a number of signals in a time measuring channel array.

In combination with deflection units and mobile carriers: taking of large-volume distance images of the environment.

The performance capability of sensors which work with the pulse TOF method can be provided at every distance image point by the invention. The advantages of the pulse TOF method have already been demonstrated in a number of simple sensors not suitable for the taking of distance images.

In comparison with stereoscopic image taking with e.g. two CCD cameras in which light per picture element is converted into charge, the charges are integrated over a time period and then read out serially, that is the light used does not have to be generated beforehand and only one path (reception) has to be provided technically, the substantial challenge in the distance image taking by means of the pulse TOF method consists of the fact that here first an electromagnetic and directed beam or part beam has to be generated per distance picture element and then its TOF per picture element has to be measured, that is that two paths have to be provided from a technical aspect. The effort per picture element is therefore substantially higher. There are, however, substantial advantages of the pulse TOF method.

The TOF of the pulses is substantially shorter in comparison with the integration time with CCD cameras, which corresponds to a substantially shorter measuring time. The integration time must also be extended due to a plurality of repetition measurements with CCD distance cameras in which a strong light pulse is transmitted and the integration time of a single pulse lies in the range of the TOF. By a skilful multiple utilization of an array of distance measuring channels for the parallel taking of a plurality of distance image points, this shorter measuring time in the pulse TOF method can be used in that a distance measuring channel is not provided for each distance picture element, but that this array is used a multiple of times sequentially for a number of distance picture element groups and the distance image is assembled from the distance picture element groups. This approach is still more expensive than a CCD chip since the limited array and the means for multiple utilization still have to be made available, but the performance capability of a distance measuring channel with the pulse TOF method with its advantages is obtained at each distance measuring point. A distance measuring channel array with performance features of the pulse TOF sensors and means for multiple utilization for distance image taking is made possible by the invention, whereby new applications, which will be looked at in more detail in the following can be realized in an economical and technical aspect.

The sensitivity of a pulse TOF measuring channel can be increased significantly with the known KEM principle already mentioned above while avoiding the above-mentioned computing effort. The invention makes apparatus possible in which the measuring speed can generally be significantly increased by means of highly integrated time measurement ICs which include a time measuring channel by massive parallel processing in the presence of a number of parallel and serial signal inputs. It is set forth here how many signals have to be configured by suitable transmitter and receiver arrays and combinations thereof, how the transmitter and receiver arrays can be combined with a time measurement IC, which contains a number of time measuring channels, and with deflection units and carriers to obtain apparatus with which a taking of distance images can be done fast, precisely, with a high range, with high lateral and distance resolution and suitable for external applications.

In particular a combination is provided by the invention of suitable and efficient transmitters and receivers in an array arrangement which deliver a large number of parallel signals with associated start pulses, with an innovative time measurement circuit consisting of an array of time measuring channels which evaluate the measurement in a plurality of adjustable measuring modes.

The total time measuring circuit is preferably manufactured as an integrated IC e.g. in CMOS. 2D distance images can thus be taken without mirror scanners and 3D distance images with only one single suitable mirror scanner. The time measuring method used can be based on the said KEM principle. The invention permits a realization of this known time measuring method by innovative circuits, modules and arrangements of components and modules which are also the subject of the present invention.

A possible aspect of the invention will be described in the following:

The following can be provided in the time measuring IC in accordance with the invention: In a number of time measuring channels, the respective TOF of a large number of pulses is measured in parallel independently of one another, with the same start pulse or with different start pulses and the associated signals. The signals to be processed are faded analog or faded digital signals which arise in that the analog signal (6) is previously guided via a comparator (4) or is converted (digitized) by means of sensitive input buffers of the time measurement ICs into logical signals. Each start pulse is combined with the associated signal pulses on one line to form a pulse chain, with the noise around the start pulse being suppressed. One pulse chain to be processed results per time measuring channel. The up events (pulse start) and dw events (pulse end) of all the pulses of this pulse chain are measured starting from a point in time just before the first start pulse (first pulse). The pulses to be processed can be either a start pulse or echo or noise pulses. The information of the pulse chain is thus reduced to two events (up and dw events) of each pulse. The extent of information to be processed is increased in comparison with the extent of information in pulse TOF sensors existing today proportionally to the number of the pulses to be processed, but much smaller than with sensors using analog/digitally converted pulse chains with a sampling rate in the GHz range.

The time measurement generally takes place by two part measurements:
1. Counting of positive or negative flanks of an accurate measurement clock signal supplied from outside as a time scale, from the start of measurement to each event;
2. Measurement of the pulse width of the part periods (TP) which occur.

The numbers of positive or negative flanks of the measurement clock from the starting point in time set just before the start pulse up to the coming first positive flank of the measurement clock after all events of all pulses of the pulse chain are to be counted with the first part measurements. The width of the counters for the measurement clock flanks is selected such that the TOF can be unambiguously counted. If, however, the width of the counters is restricted e.g. to 8 bits, so that only up to 255 flanks can be unambiguously counted, the unambiguity is established over larger time ranges by marking the overflows of the counters in the corresponding memory region. Measuring ranges of practically any desired length can thus be realized.

The pulse width of a TP pulse counted too much at the start of each pulse of the pulse chain and the pulse width of a TP pulse counted too much at the end are detected metrologically using the second part measurement. The pulse width of the part period of the up event and also the pulse width of the dw event must therefore always be subtracted. Because the pulses of the pulse chain are asynchronous to the measurement clock signal, the TPs have a random pulse width, with the period of the measurement clock being the upper limit. The TPs are converted e.g. by means of TDCs into digital values as multiples of delay times of delay elements of the TDCs. The resolution of the time measurement of the first part measurement is thereby incremented by addition of the second part measurement to the delay time, e.g. 50 to 100 ps, corresponding to a fictitious measurement clock of 10 to 20 GHz. The period of the measurement clock divided by the number of the delay times gives the delay time which is preferably recalibrated, due to slight temperature dependence, continuously in the processor system between the measurements.

Re-triggerable or continuously measuring circuit parts are provided in each time measuring channel for both part measurements for the processing of a large number of pulses (start pulses, echo pulses and noise pulses) in the event of a low choice of the comparator threshold. All the events are each present as two measured values after the two part measurements. The TOFs of all pulses, related to the first start pulse, are given by subtraction of the start pulse up event from each event of all pulses of the pulse chain. If no noise pulses occur, but only an echo pulse (special case with reference (5)>4.5 NEP), then the measured results are generally the same as the results which are achieved with the pulse TOF sensors explained above and available today if the parallelism in accordance with the invention of a number of time measuring channels and the multi-echo evaluation are left out of consideration.

In aspects of the invention, some general precautions can be taken which have to be considered due to the finite processing speed in electronic circuits and to the finite circuit extent, but also for general reasons in specific cases:

If the pulse to be measured is shorter than a period of the measurement clock (central clock), the TP pulses of the up and dw events can overlap in time. To be able to measure both pulses, generally two TDCs are present for the up and dw events and two counters are present for the counting of the measurement clock flanks per time measuring channel. A time measuring channel thereby generally has a split into a branch for the processing of the up event and a branch for the dw event, with the two branches having an identical structure.

Furthermore, the TDCs are each blocked at least for so long until the result of the time measurement of an event is secured. Noise pulses or also echo pulses can follow on from one another closely in time at a low position of the comparator threshold, which represents a particular challenge for the event measurement. Since a TP pulse is in the TDC at least for the duration of a measurement clock period (plus further gate throughput times) before it has been processed and since the input for following pulses therefore has to be blocked, it is necessary with a close sequence of the noise or echo pulses to direct the pulses of a pulse chain alternately into a plurality of channels by means of a circuit part known as a "pulse switch", whereby the mean processable sequence frequency of pulses increases proportionally to the number of channels. In view of this background, different measuring modes can be introduced because it cannot be assumed that a high density of pulses is present in the pulse chain in all applications.

Provision is accordingly made in a possible embodiment of the invention for the pulse chains to be controlled with one pulse switch with corresponding measurement modes to 1 or 2 or 4 time measuring channels arranged in parallel. For this purpose, 4 time measuring channels with the designations A, B, C and D are provided so that these 4 time measuring channels are combined to one group in the time measurement IC which is called a "Sub-Array Element" (31) (cf. also FIGS. 8 and 9). The spacing of the processable pulses of a pulse chain can be reduced by this measure to a half or a quarter (in a special embodiment e.g. down to approx. 3 ns). With 4 time measuring channels, a total of 8 TDCs and 8 counters are present.

The measurement clock is selected as a sufficiently temperature-stable component to have a reliable and accurate scale for the distance measurement in the sensor. Since the delay time is temperature dependent, the period of the measurement clock in delay times present in the TDCs are calibrated by delay elements. The period of the measurement clock divided by the number of delay times then gives the delay time. This calibration can take place completely in a part program of the evaluation program of a microprocessor system of the apparatus which accesses the constantly generated part measurements and evaluates them in a suitable manner.

Furthermore, a separate memory region (26) is in particular provided for all time measuring channels (cf. also FIG. 8) in which the data of one or more pulse chains are stored and from which the data are transferred to the microprocessor system after the measurement. This memory region is preferably organized in lines, with a line in the memory being associated with each pulse of the pulse chain. The information content of the lines of a measurement is called an event list. The number of the lines is orientated on the number of the pulses in the pulse chain in the TOF required as a maximum On a comparator reference of 0 V (reference equal to mean value of the noise; this corresponds to the maximum sensitivity increase), approximately 0.02 pulses/ns occur on average at a bandwidth of the receiver of 150 MHz, i.e. the mean rate of the noise pulses amounts to approx. 50 MHz. A choice appearing sufficient for this is 128 lines per time measuring channel. In a measuring made in which the pulses of a pulse chain are distributed serially to 4 time measuring channels, a total of 512 lines are then available. With the mentioned mean noise pulse density of 50 MHz, 512 lines would correspond to a TOF of approx. 10 microseconds, which corresponds to a target distance of 1.5 km. This working range would reduce to still 375 m on use of only one single time measuring channel.

In a further possible embodiment of the invention, n times 4 parallel time measuring channels can be integrated as n sub-array elements (31) in the time measurement IC (32). These 4 channels of the sub-array element can also process 4 or 2 or 1 independent measurements independently of one another in the corresponding measurement mode, which can be controlled by selectable measurement modes. The measurement modes are activated by external control signals. Each channel has independent signal inputs to also be able to carry out independent measurements. The measurement modes are called 1 channel mode, 2 channel mode and 4 channel mode, with the 2 channel and 4 channel modes being suitable both for serial and for parallel processing. The serial processing is selected with a large time noise pulse density or a long measuring time, whereas the parallel processing is selected with a low time noise pulse density and a shorter measuring time. In a further measurement mode, a resolution increase can be achieved with the same input signal in a plurality of time measuring channels in that measurement clock signals phase-shifted by 90° and/or 180° in the time measuring channels are used and the results of the channels are subsequently averaged.

With distance images whose taking was previously greatly accelerated by the use of transmitter and receiver arrays, these possibilities (i) increase the accuracy of the distance measurement or the sensitivity by repeat measurements or by the use of parallel time measuring channels for a distinguishable distance picture element; and/or (ii) increase the detectable multiple echo pulse density up to a minimal pulse spacing of approx. 50 cm with almost any desired number of echoes in all picture elements by the use of parallel time measuring channels with which the pulses of a pulse chain of a picture element are serially supplied (distribution). Both again annul a part of the speed increase, but supply the mentioned metrological improvements.

The described possible aspects of the time measurement ICs in accordance with the invention with the described properties male it possible that a plurality of single measurements are processed as a single measurement (also termed a "burst measurement" in the following), whereby a further speed increase is achieved. In this connection, a plurality of start pulses occur which are each marked by markings in the memory region of the time measurement ICs. In this manner, the association of the information in the memories of the time measuring channels to the individual measurements is ensured with the help of the start pulse markings and the individual measurements of a burst measurement can be averaged simply and fast e.g. to increase the sensitivity. Since the individual measurements within a burst measurement are generally carried out very fast after one another, the burst measurement is in particular suitable for a sensitivity increase with time measurement ICs in which a number of signal groups are switched serially to the time measurement IC with multiplexers or for apparatus equipped with deflection units in which the transmission and visual spatial angles for the distance profile taking are admittedly continuously deflected, but can nevertheless be assumed to be quasi idle for the averaged individual measurements due to the brief duration of a burst measurement.

The event lists of all time measuring channels can be read out via e.g. a 32 bit wide parallel interface in the measuring breaks between the individual or burst measurements of the processor system. The ordering of the event lists in accordance with the different measurement modes and the sorting of individual measurements within a burst measurement take place in the processor system (28) connected afterward.

As already mentioned, the invention permits applications not realizable to date. The applications for apparatus for distance image taking are extremely versatile and comprise the most varied demands. The invention makes sufficiently fast, accurate, sensitive and robust apparatus available for the continuous distance image taking, whereby applications are opened up in a number of application areas with substantial markets. The following list of potential application examples supplies an overview:

static distance image taking from fixed points, e.g. for monitoring, object measurement and for occupied monitoring such as in car parks, airfields, storage areas at container terminals, railroad tracks, assembly points indoors and outdoors, elevators, cable cars and lobbies therefor, door openings of automatic doors and gates, building sites and accident sites dynamic distance image taking from private automobiles, trucks, cranes, railroads, helicopters and aircraft, e.g. for object detection and measurement and 3D surface measurement such as in obstacle warning in the approaching and direct movement zone and with autonomous vehicle guidance in which the vision sense of humans should be replaced or complemented, with load pick up and load discharge, e.g. with cranes, on the fast measurement of landmarks for navigation systems, on road surface measurements and on measurements of the terrain and city morphology from aircraft and vehicles, with working plant in which the working region is taken for evaluation as a dynamic distance image;

motion monitoring by means of dynamic distance image taking on the airfield, in the container terminal, on the docking of ships and aircraft, on the sports field, in security zones, safety-sensitive zones such as locks, crossing zones, railroad crossings and escalators;

object counting by means of dynamic distance image taking such as in traffic monitoring, in vehicles and in humans and animals;

monitoring of the open profile by means of dynamic distance image talking in tunnels, mines and galleries of mines;

geodetic measurement in which the morphology of open terrain, cities and roads, etc. is detected by means of static and dynamic distance image taking.

In these applications, a benefit can be generated with the distance images which can be realized in accordance with the invention which cannot currently be achieved. The above exemplary itemization shows that essential applications are in the outdoor area and therefore require dynamic distance profiles or distance images. For this reason, the sensors provided for the distance image taking should be environmentally resistant, deliver reliable measured values under adverse weather and pollution conditions and have sufficient dynamic properties. It is exactly this that can be realized in accordance with the invention.

BRIEF DESCRIPTION OF THE DRAWINGS

The invention will be described in the following by way of example with reference to the drawing. There are shown:

FIGS. (1) to (26) representations for the explanation of embodiments, including applications of an apparatus in accordance with the invention as well as of a method in accordance with the invention for the time measurement or the distance image taking using pulse TOF measurement, with short laser pulses being used as pulsed electromagnetic radiation;

In the following FIGS. (1) to (6), an embodiment is shown of the transmitter and receiver arrays for the apparatus for distance image taking using a pulse TOF measurement. Short laser pulses are used as pulsed electromagnetic radiation, with transmitter elements (10), e.g. semiconductor laser diodes, and receiver elements (2), e.g. APDs (avalanche photodiodes) being provided. This is the embodiment with possibly the largest practical dissemination so that this specific aspect of the invention, which is generally only to be understood as an example, will be used for the further explanation of further embodiments of the invention.

DETAILED DESCRIPTION OF THE PREFERRED EMBODIMENTS

Figure 1:
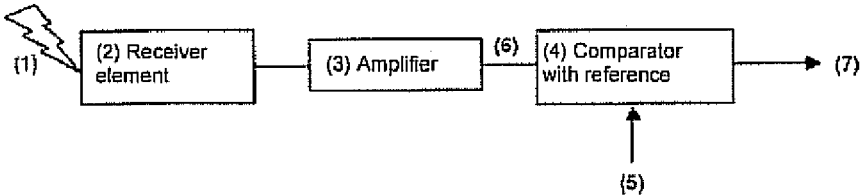

FIG. 1 shows the basic structure of a receiver comprising an APD (2) with which the optical pulses (1) reflected from a target and received via a receiving lens as a converging radiation system (48) (cf. FIGS. 12a, 21-23) are converted into electrical signals, followed by a broadband amplifier (3) and a comparator (4) with the adjustable reference (5) and the digitized output signal (7).

Figure 2:
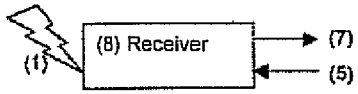

The elements of the receiver are assembled in FIG. 2 to form a receiver module (8). The module (8) has the digitized output signal (7) and the reference (5).

Figure 3:
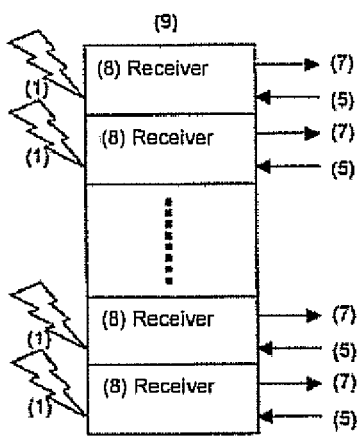

In FIG. 3, the receiver modules (8) from FIG. 2 are assembled to form a receiver array (9) and deliver the input signals (7) for the time measuring channels. If only one laser beam (14) from one laser (10) is present, part rays of an optical pulse (1) reflected by the receiver array (9) are detected. If a plurality of lasers (10) transmit an array of laser beams, then part arrays of the receiver array (9) each detect the beam of one laser. All array elements of the receiver array (9) have a reference input for each of the comparators (4).

Figure 4:
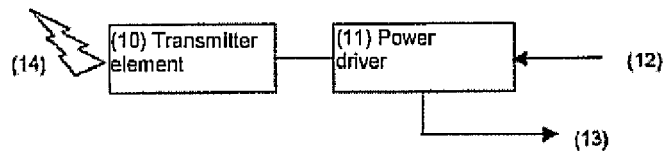

FIG. 4 shows the basic structure of a pulse laser with the laser diode (10) with which the optical laser pulse (14) is generated. A current pulser (11) is present for the operation of the diode (10) and a current pulse is produced by it for the generation of the optical pulse in the laser diode. The current pulse is triggered by a signal (12) and additionally converted into a start pulse (13), e.g. in a non-contact manner by means of a small coil as the sensor.

Figure 5:

In FIG. 5, the elements of the laser are assembled to form a laser module (15) and are shown with the trigger signal (12) and the start signal (13).

Figure 6:
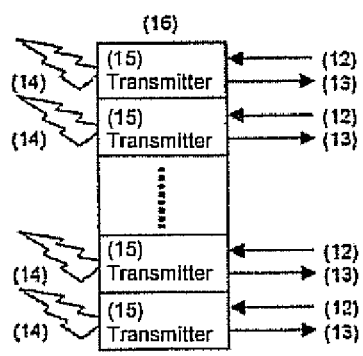

In FIG. 6, the laser modules (15) of FIG. (5) are assembled to form a laser array (16a) and deliver all the optical laser pulses (14) as a transmission spatial angle array in which reflected laser pulses can be detected in the visual spatial angle of the receiver array (9). All the lasers can be triggered individually via the lines (12), with one start pulse (13) being delivered per laser.

With an arrangement of the receiver array (9) and a laser array (16) and associated optical systems, not shown here, the start pulses and signals can be generated, and from them the pulse chains to be processed by the time measurement IC, to show an apparatus in accordance with the invention for time measurement for fast distance image taking with pulse TOF measurement.

In this connection, in different embodiments, both start pulses (13) to be processed in parallel with associated signal pulses (7) can occur when a laser beam is detected by a group of receivers of the receiver array (9) which are then all processed in time measuring channels present in parallel, and start pulses with associated signal pulses to be processed serially can occur when the laser beams (1) are detected sequentially by groups of receivers (8) of the receiver array (9) arranged in parallel which are then either supplied to the same set of time measuring channels by means of multiplexers (18, 19) (cf. FIGS. 7 and 8) or—if sufficient time measuring channels are present—can all be processed in parallel. An advantageous number of receivers in a group is exactly the same as the number of measuring channels in a sub-array.

The basically provided circuit parts, which a sub-array element of this time-measuring IC at least includes, are set forth in FIG. (7). The basic tasks of the circuit parts are set forth in the following list:

(20) Input Mixer

The job of the input mixer is

The control and guidance of the input signals (start pulse and signal) into the time measuring circuit which can be configured as an integrated time measurement IC;

Adding of the start pulse and the associated signal to form a pulse chain;

Liberation of the start pulse from echo and noise pulses in settable times starting from the measurement start up to after the start pulse end for the near range suppression of signals and noise;

Blocking of the inputs after the desired TOF

(21) Pulse Switch

The job of the pulse switch is

To distribute the pulses of the pulse chains into one or more time measuring channels in parallel or in series;

To distribute measurement clock signals of the same phase or of a different phase into a plurality of time measuring channels

(30) Clock Unit (Central Clock)

The job of the clock unit is

Preparation of the measurement clock signal from an external precision clock for the time measuring channels;

Generation of measurement clock signals with different phases on all time measuring channels;

Reduction of the power consumption by control inputs in time measuring channels not used or in break times;

(22) TP Separators

It is the job of the TP separators to generate the TP pulses in all time measuring channels (TP=part period).

(24) Delay Arrays

It is the job of the delay arrays to measure the two different TP pulses of each pulse of the pulse chain of each time measuring channel in delay times.

(25) Decoders

The job of the decoders is the implementation of the two pieces of output information of the delay arrays in binary encoded information. This information is provided per time measuring channel in latch arrays to which the information "start pulse" is added.

(23) Counters

It is the job of the counters to measure all the events with the resolution of the period of the measurement clock and to latch the overflows in latch arrays. Two counters per channel are present.

(17) Measurement Procedure Control

It is the job of the measurement procedure control to control the framework of the measurement. This includes 1. Controlling the individual measurement
2. Controlling the burst measurement
3. Triggering the laser modules
4. Processing scanner angle signals (if present)
5. Controlling the multiplexers (if present) for the receiver signals and start pulses
6. Power-save control, and indeed while using external static control signals, namely:

1. Control signals for the selection of measurement modes
2. Control of the near range muting
3. End of measurement control (limitation to the desired TOF)

(29) Time Measurement Control

It is the job of the time measurement control to control the time measurement in the time measuring channels in accordance with the statically applied control signals as a result of the selected measurement modes and the reset signals changing dynamically. The following processes are controlled by the time measurement control:

4. TP pulse generation
5. Digitizing and making available of TP pulse widths for storage
6. Counter value generation and making available for storage
7. Storage of the binary converted TPs and counter values as part measured values
8. Forming of lines in the memory per pulse of the pulse chain (called "event list") from the part measured values in dependence on the measurement mode
9. Start pulse marking
10. Overflow marling
11. Control of the storage

(26) Memory

All part results of all events, including overflows and start pulse markings, are stored in the memory.

(27) Interface

It is the job of the interface to transmit the information in the memory controlled by the processor system to the outside.

Figure 7:
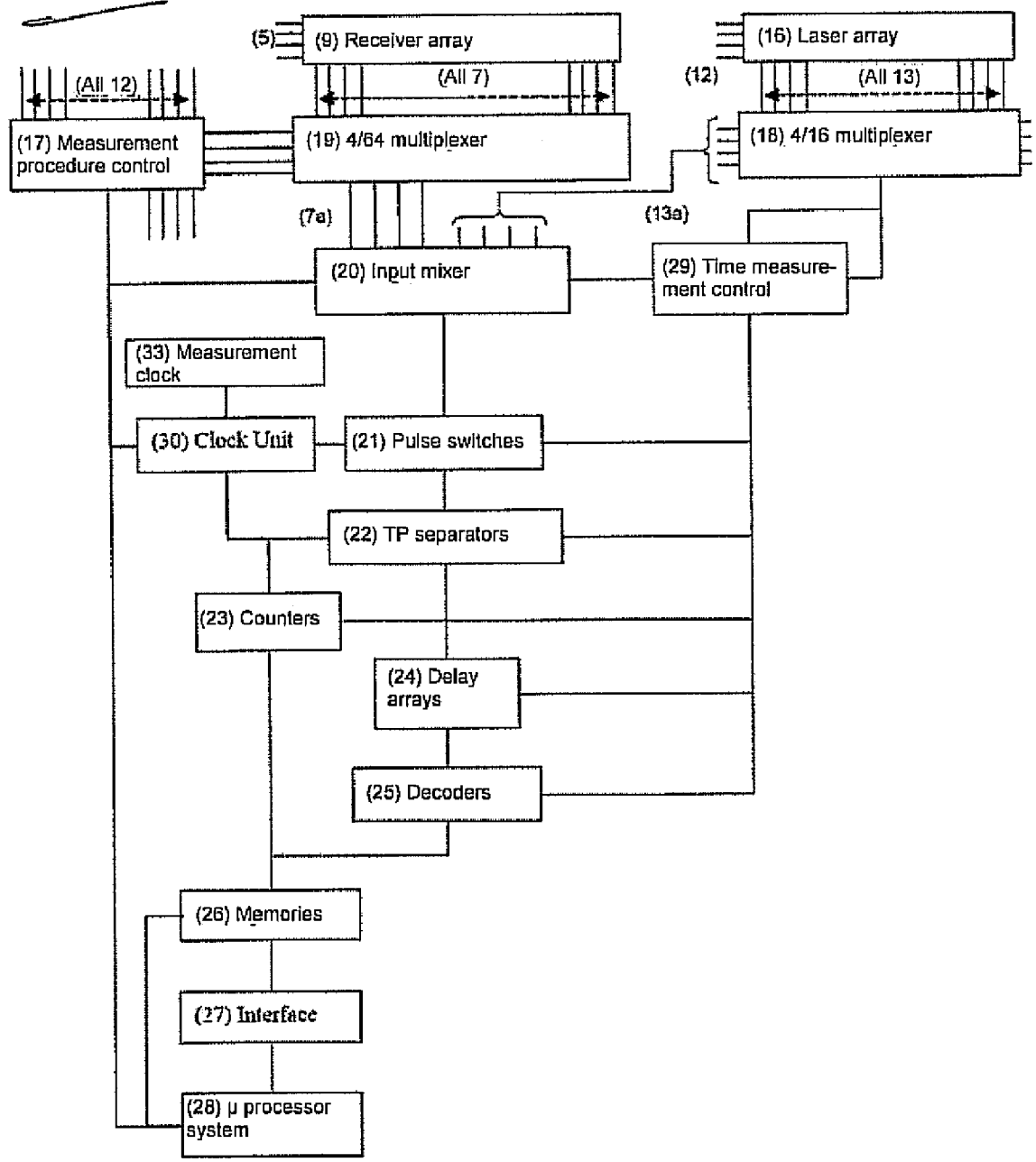

The basic block diagram in FIG. 7 shows a possible time measurement IC of a sub-array element in accordance with the invention having four time measuring channels (any other number of time measuring channels would likewise be possible) as indicated by the signals (7) and (13) whose jobs are mentioned above.

The functions of the circuit portions of the time measuring device will be described in the following.

The input signals are all start pulses (13) and all digitized signals (7). The selection of the group receivers and the associated start pulses takes place by the control lines of the measurement procedure control (17) which act on the multiplexers (18) and (19). The lasers are triggered serially by all trigger lines (12). The multiplexer (18) directs the start pulses (13) connected through and the multiplex (19) directs the associated signals (7) connected through to the input mixer (20). The signals (7) are suppressed up to a point in time after the start pulse in time and the start pulse is added to this gap in a correct time manner, whereby the already mentioned pulse chain of start pulse and echo and nose pulses arises. It is thereby ensured that the start pulse is not deformed by noise pulses, which would artificially degrade the time measurement result. The signal for the near range suppression is delivered from the measurement procedure control (17).

The output signals of the input mixers (20) are supplied to the pulse switches (21) in which the pulse chains connected through to be measured are distributed in parallel or in series to two or four time measuring channels after running through the input mixers (20).

The output signals of the pulse switches (21) are supplied to the TP separators (22) in which part periods are derived as pulses for all branches of the time measuring circuits. The TP pulses are formed with the positive and the negative flank of the pulses up to the respectively following positive flank of the measurement clock signal used. Two TP separators are therefore present for each time measuring channel. In this connection, those pulses are used which have already run through the pulse switch (21).

The part periods TP will inter alia be looked at in detail again in the following in conjunction with FIG. 9.

The TP pulses of the TP separators (22) are supplied to the delay arrays (24) and are measured there as multiples of a delay time of a delay element. There are two delay arrays for each time measuring channel, and indeed one delay array for the positive pulse flank and one delay array for the negative pulse flank. The TP pulses are widened somewhat (offset) in a technical circuit manner before entering into the delay arrays (24) so that very short TP pulses with a value different from zero can also be measured.

The TP pulses are delayed by delay elements of the delay array, are compared with one another and the information whether the delayed pulse still overlaps with the output pulse is stored in a latch. The securing of the information takes place in a latch array having e.g. 80 elements. Corresponding to the two TP pulses, there are two delay arrays per channel. The resolution of the time measurement is thereby increased to the delay time. The measured value is shown in the 80 lines with a logical value different from the state of rest. The maximum delay number corresponds to the period of the measurement clock converted into delay times plus offset.

The width of the TP pulses in delay times is converted into a binary number in the decoder (25) and is made available per channel in latch arrays. The information that it is a start pulse is furthermore likewise stored in a latch.

Four measurement clock signals with the 4 phase angles 0°, 90°, 180° and 270° are generated in the clock unit (30).

All the events are measured in the counter (23) with the resolution of the period of the measurement clock in that the count is read out at the positive flank of the measurement clock following the pulse flanks and in that overflows of the counters are likewise detected. Two counters are present per time measuring channel.

The part results for each event comprising the count, on the one hand, and the binary value for the TP pulse width, on the other hand, as well as the optionally present overflow marking and the start pulse marking are stored linewise in the memory (26) for each time measuring channel. It is ensured by the time measurement control (29) that the part results are generated, are made available at the correct time for storage in latches, are stored in the memory and the function blocks to be measured are then switched free for the next measurement.

After the end of the measurement, the memory content is read out via the interface (27) controlled by a microprocessor system (28) and processed into distances using the evaluation software.

The circuit parts of input mixer (20), pulse switches (21), TP separators (22), delay arrays (24), decoders (25), counters (23), interface (27) and time measurement control (29) are preferably suitable for the integration in a time measurement IC. Less well suited or unsuitable for integration in a time measurement IC are the laser and receiver arrays (9, 16), the measurement clock (33) and the measurement procedure control (17) with the multiplexers (18, 19), because these function blocks are subject to adaptation related changes or are technically not uniform.

Figure 8A:
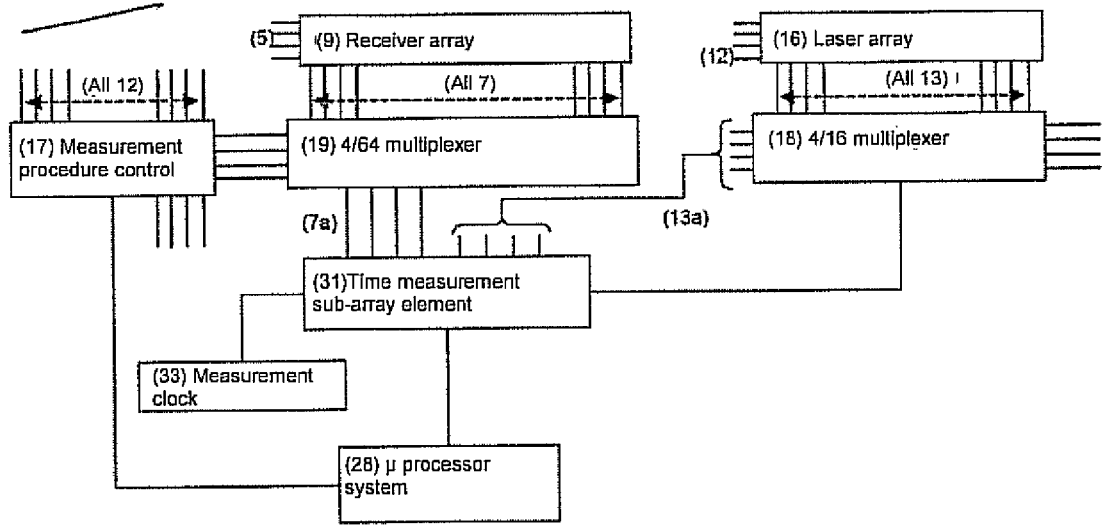

FIG. 8a shows an example of an aspect in accordance with FIG. (7), with in this aspect the time measurement circuit being configured as a sub-array element (31) with four time measuring channels as an integrated time measurement IC. The laser modules of the laser array (16) are serially controlled via all trigger lines (12) using the measurement procedure control. The desired maximum TOF has to be waited for before each trigger of the following laser module. The number of the outputs of the receivers (7) are selected as multiples of four so that, with the multiplexer (19), its outputs (7a) can be switched sequentially to the time measurement IC (32). Each laser beam is detected by four receivers (S) of the receiver array (9). The associated start pulses are switched as start pulses (13) to the sub-array (31) by the multiplexer (18) synchronously to the switched receiver or multiplexer outputs (7a).

Figure 8B:
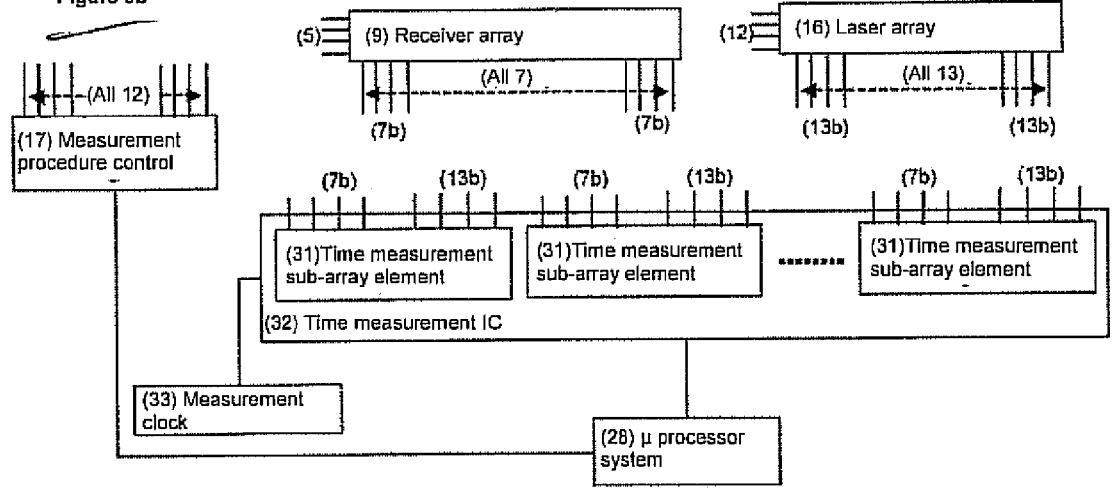

FIG. 8b shows an example of an aspect in which the time measurement circuit is configured as an array of sub-array elements (31) each having four time measuring channels in accordance with FIG. (8) in the form of an integrated time measurement IC (32). In this embodiment, the measuring speed is optimized because all the laser modules (10) of the laser array (16) can be triggered in parallel and one respective measuring channel is present for all the receiver modules (8) of the receiver array (9).

2D distance images (profiles) can be taken without a mirror scanner using the aspects of the apparatus in accordance with FIG. (8a) and FIG. (8b). The configuration can be expanded to an apparatus for 3D image taking by means of a single mirror scanner.

Figure 8C:
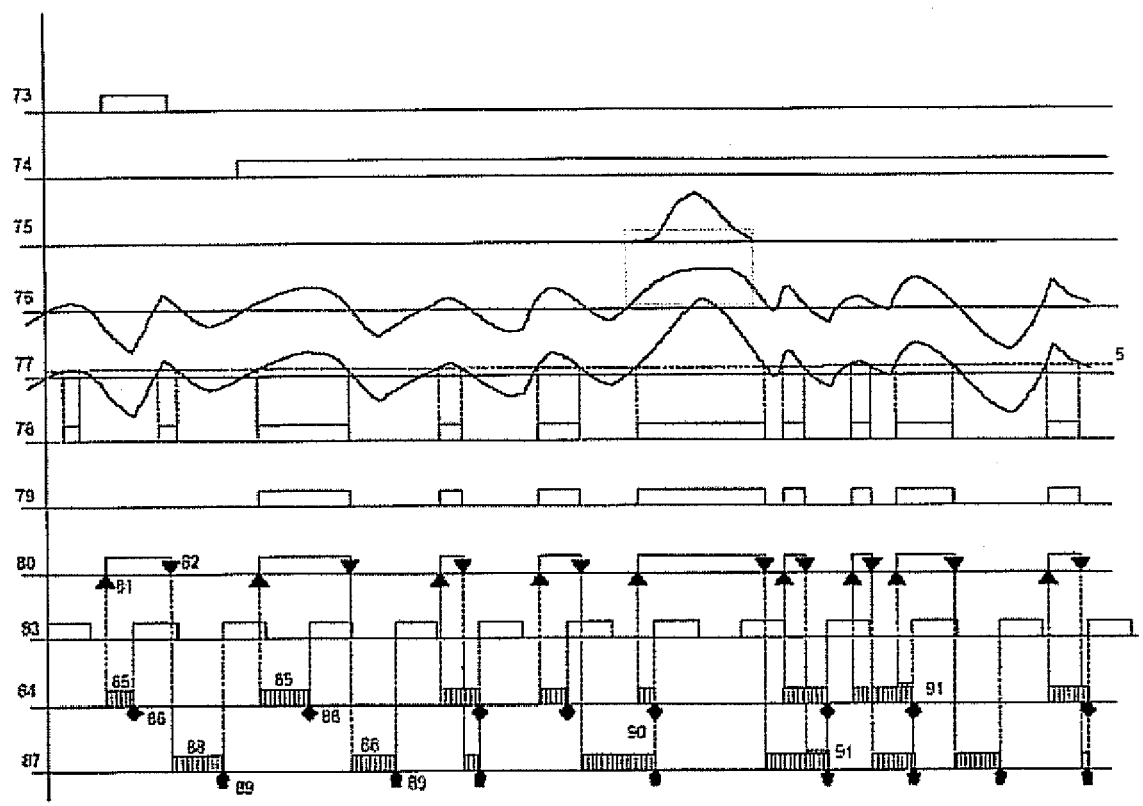

FIG. 8c serves inter alia for the explanation of the principles of the mentioned KEM principle as well as of the mentioned part periods (TP).

The start pulse (73) and the analog echo signal (75) belong to the signals to be processed and the analog echo signal forms the analog receiver signal (77) together with the noise of the receiver (76) in accordance with (6) (cf. FIG. 1). The analog receiver signal (77) is converted to digital receiver pulses by means of a comparator (4) which has the reference (5) and is masked with the signal (74) to suppress analog signals in the near range around the start pulse, whereby the resulting signal (79) is produced, or to displace the measured zone into a remote zone. The start pulse (73) and the resulting signal (79) are combined in a correct time manner to form a pulse chain (80). The positive flanks (81) of the resulting signal (79) or of the pulse chain (80) are the up events to be measured and the negative flanks (82) are the dw events to be measured (dw=down). The measurement clock signal (83) is used for the measurement.

The counter numbers belonging to the up events (81) are the past numbers of the periods of the measurement clock and are shown by diamonds (86). The part periods of the up events (up TP) are the vertically hatched pulses (85). The time points of the up events are therefore formed by the counter numbers (86) less the respectively associated part period (85). The counter numbers belonging to the dw events (82) are the past numbers of the periods of the measurement clock and are shown by short arrows (89). The part periods of the dw events (82) (dw TP) are the vertically hatched pulses (88). The points in time of the dw events (82) are therefore formed by the counter numbers (89) less the respectively associated part period (88). The points in time of the up events (81) of the pulse chain (80) are therefore shown by the measured values (85) and (86) and the points in time of the dw events (82) are shown by the measured values (88) and (89).

The TPs are digitized by means of TDCs and are expressed as multiples of the delay time. The counter numbers are multiplied by the number of the delay times contained in a period of the measurement clock. All the values are thus present as multiples of the delay time and counter numbers and TP widths can be combined to form one number. The highest possible value is the maximum TOF as a multiple of the delay time. If, for example, the delay time amounts to 100 ps and the maximum TOF to 1000 ns, the maximum value of an event which can occur amounts to 10,000. A memory cell in the time pattern memory is associated with each of the values from 1 to 10,000. The design of the time pattern memory is, however, only necessary when the reference (5) is less than 4.5 NEP of the noise (76). If the period of the measurement clock itself were to be used as the delay time, the rough time pattern memory results. At a period of 5 ns, the rough time pattern memory has only 200 memory cells. The accuracy and the computing effort reduce in accordance with the number of memory positions on the averaging of the pulse chains (80), and indeed in this example arrangement by a factor of 50.

An up TP (85) and a dw TP (88) can overlap, as is shown at point (90) of the signals (84) (up TP signal) and (87) (dw TP signal). For this reason, one branch is provided for the measurement of the up events and one branch for the measurement of the dw events within one time measuring channel. Furthermore, sequential up or dw TPs of two sequential pulses of the pulse chain (80) can overlap, as shown at point (91). For this reason, the so-called "serial measurement mode" is provided in which the pulses are distributed serially to a plurality of time measuring channels. The distribution of the pulses of the pulse chain (80) takes place by means of the pulse switch (21).

Part Programs of the Processor System:

Program parts which only ensure the procedure of the measurement will not be described.

The evaluation of the processor system controls the reading out of the event lists from the memory of each time measuring channel of the time measurement IC (32) into the memory region of the processor system (28) and calculates the distance values in accordance with the set measurement mode from the event lists.

A calibration of the time measuring system is provided for this purpose. The measurement clock serves as the absolute reference and is considered as without error for this purpose. In a part program, the period is calculated as a multiple of the delay time from the part measured results of the pulse widths of the TP pulses and the absolute delay time is determined therefrom. The result is a factor which indicates how many delay times correspond to a period of the measurement clock.

In a further part program, all counter values are multiplied by the said factor. The binary converted pulse widths of the TP pulses can now be combined with the counter values to form a number. The values are the events, measured in delay time. To relate the events whose time was counted from an arbitrarily fixed measurement start to the start pulse, the value of the start pulse up event is subtracted from all the events in a part program. All the events are then present as a list in the memory of the processor system in a calibrated scale as a binary number, counted from the start pulse event.

For the averaging (cf. KEM principle) of measurements, these values are input by means of a further part program into a time pattern memory in that every possible value represents the address of a memory cell and in that a 1 is added to the content of the memory cell on the occurrence of an up event and −1 on the occurrence of a dw event. As many measurements as can be set can thereby be added. The content corresponds to the first derivation of the addition of the pulse chains. The addition of the pulse chains is called the "SW amplitude function" (SW=software) or in short "SW amplitude". One consequently arrives at this SW amplitude in that the content of the time pattern memory is integrated in a further part program. Since this integration would be carried out over a very large number of cells (TOF divided by delay time), the same above calculations are carried out with a further part program, only with the counter values without taking account of the part periods ("rough integration"), which results in the rough SW amplitude. The calculation effort for this is approximately 50 times smaller than for the calculation of the SW amplitude.

The mean value of the noise of the SW amplitude is calculated using a further part program and a SW reference value for the detection of pulses in the SW amplitude is determined in that the required probability of the detection of a noise pulse is not exceeded. The events of the signal pulses are found as breach points by applying the SW reference to the rough SW amplitude. These events are called "SW rough events". The integration ("fine integration") of the content of the time pattern memory is integrated in a small region with this address as the center at these addresses of the SW rough event (converted into delay times). The shapes of the pulses of the SW amplitude result in this process.

In a further part program, the flanks of these pulses are approximated by straight lines and are brought to intersection with the center line of the noise of the SW amplitude. These points are nadirs of the pulses which are independent of the variable amplitude of the pulses and which are corrected by means of previously recorded table values with respect to temperature drift and absolute offset and are converted into actual distances.

In another part program, the straight lines are brought into intersection with the SW reference and the points of intersection are corrected by means of previously recorded table values with respect to temperature drift and absolute offset and are converted into actual distances.

In a further part program, the pulse widths are calculated by subtraction of the SW up event from the associated SW dw event. This pulse width represents a measure for the power of the reflected pulse and is used for the error correction of the SW up event as a result of different pulse amplitudes by means of a previously recorded and stored correction table with correction values, in which a correction value is associated with each pulse width, for the calculation of the raw distance values.

In another embodiment of the evaluation program, the SW amplitudes are filtered before the processing. A boxcar filter is particularly suitable because the smoothing of digitizing portions of the SW amplitude is hereby possible with a low calculation effort.

In the above, the determination of the TPs with the help of delay elements was described. This manner of the signal delay does not, however, represent the only possibility for the TP measurement. Alternatively, the TP measurement could also e.g. take place by an n-fold phase shift of the measurement clock signals, with the phase angle difference of two sequential phase shifted measurement clock signals determining the resolution of the TP measurement.

Figure 9:
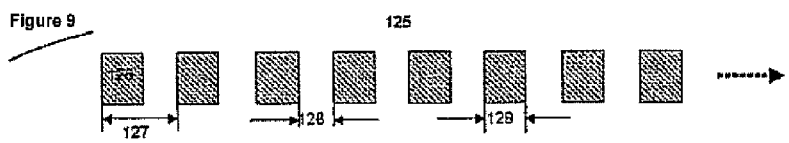

FIG. 9 shows the active zones of an APD array (125) of a receiver array (9) (cf. FIG. 3) which is substantially geometrically defined by its pitch (diode spacing plus gap) (127), its cap (128) and the active surface (126) or diode width (129). A gap of approximately 80 to 100 μm is unavoidable due to the high bias voltage of the APDs for the generation of a multiplication factor in the magnitude of larger than or equal to 100. If the pitch has twice the magnitude of a gap, 64 diodes can e.g. be produced in an array of a length smaller than 13 mm. If this array is imaged in the distance field by means of an optical projection system, an array results of 64 individual visual spatial angles (126*a*) (cf. FIG. 9*a*) which combine to form a visual spatial angle (125*a*). The size of the spatial angle is determined by the focal length of the converging optical system (48).

Figure 10:
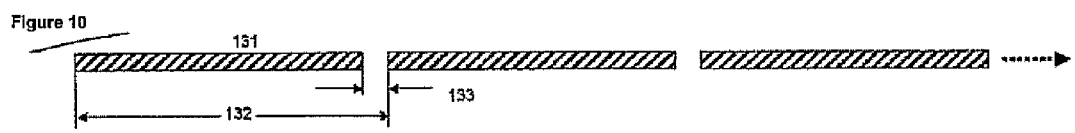

FIG. 10 shows the active zones of a laser diode array which is likewise substantially geometrically defined by its pitch (diode spacing plus gap) (132), its gap (133) and the active surface (131). As a result of the manufacturing process, a gap is present in the order of magnitude of the active zone and the width of the active zone amounts to approximately 200 μm with many available laser diodes. An array of e.g. 8 laser diodes with a length of less than 3.2 mm can thus be produced.

Due to the gaps between the laser diodes, two arrays can be suitably adjusted so that the individual transmission spatial angles form a closed array of individual transmission spatial angles. With two of these laser arrays, that is with the individual transmission spatial angles of 16 laser diodes, the visual spatial angle of 64 APDs of an APD array can be covered by means of a suitably selected focal length of the optical projection system (47). With this arrangement, a time measurement IC having 64 time measuring channels or a minimal time measurement IC having 4 channels and multiplexers for the start pulse and signals would suffice.

Figure 17:
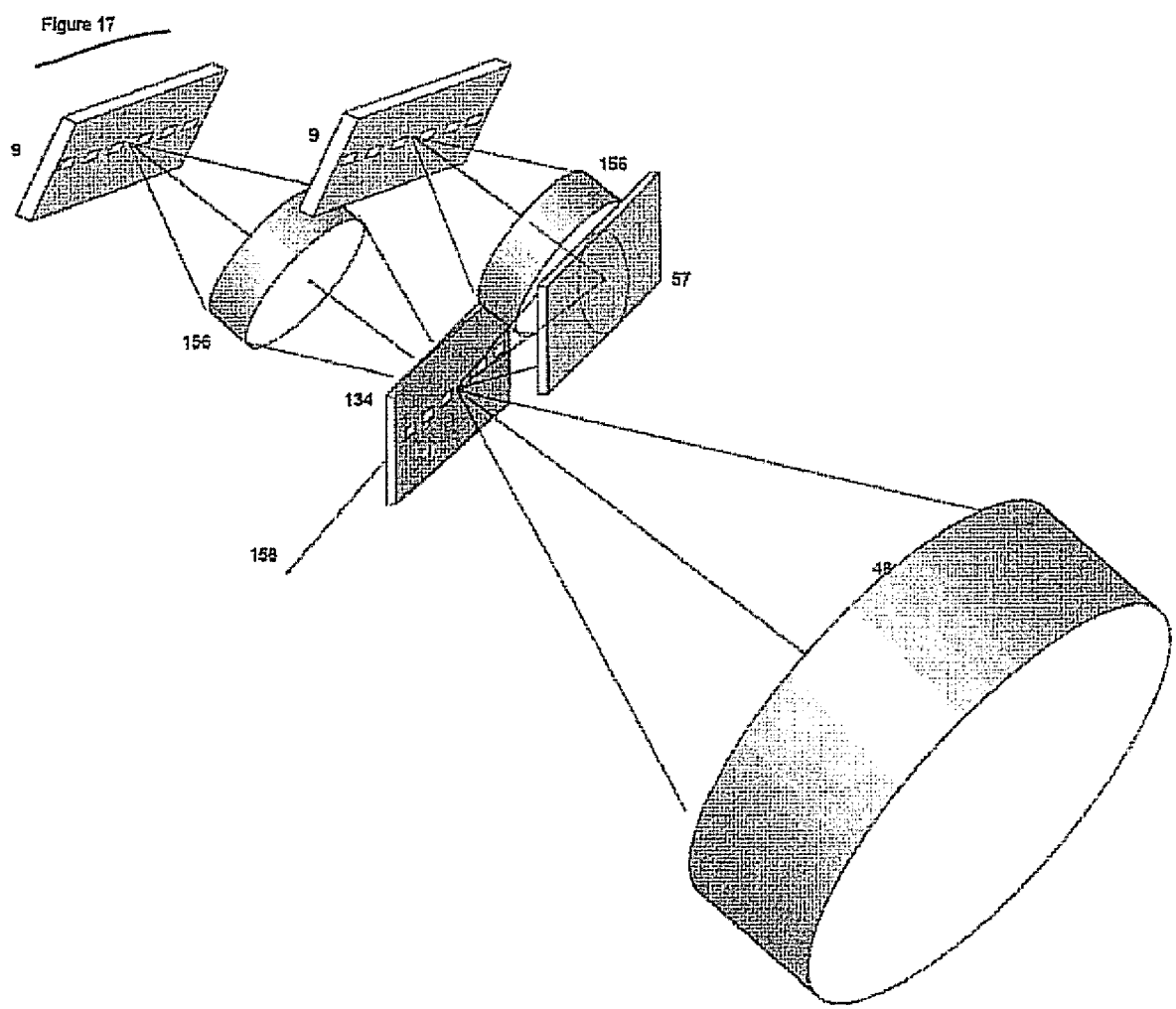

FIG. 17 shows an arrangement of this type for two APD arrays 9 which can be used correspondingly for two laser diode arrays when the APD arrays (9) are replaced by laser diode arrays.

In a further embodiment, however, 16 laser diodes with respectively associated projection lenses can also be adjusted so that the individual transmission spatial angles cover the visual spatial angles of the 64 APDs. A segment therefrom is shown in FIG. 12a in which an individual transmission spatial angle (131a) covers a total of four individual visual spatial angles (126a) of four ADPS.

FIG. 10a shows individual transmission spatial angles (131a) which e.g. arise in that a laser diode array (130) is imaged in the distance field so that the individual transmission spatial angles combine to form a transmission spatial angle (130a).

Figure 12:
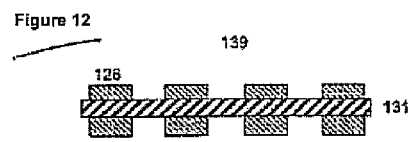
Figure 13:

FIG. 12 shows the arrangement of a segment (139) of four active zones (126) of the APDs and of the active zone (131) of a laser diode such as appear when looking through an adjusting telescope into the optical systems and which have to be adjusted so that transmission spatial angles and the visual spatial angles overlap. FIG. 13 represents the combination of a plurality of segments (139) to form an array (142).

In both cases (two laser diode arrays or 16 individual laser diodes), a reduction in the power of a laser diode to approximately ⅛ takes place because the power of each laser diode is distributed over 4 APDs and four gaps. If one assumes pulse powers of approximately 50 watts, more than 6 watts would still be incident on an APD, which would suffice for a distance measurement over several hundred meters. However, the range is also dependent on the selected focal length of the converging optical system (48) which also determines the visual spatial angle size and thus the lateral resolution. If the dimensions of the optically active zones (126) and (131) are fixed, which is normally the case due to the limited availability of the components, the fixing of the transmission spatial angle and the visual spatial angle (and thus of the lateral resolution) and of the range of the system takes place by the configuration of the optical systems. Furthermore, a range increase can be applied by averaging methods (e.g. in accordance with the KEM principle or as described in the said KEM patent application).

What is important is that a distance profile having 64 points can already be taken with the arrangement described as an example having an ADP array with 64 APDs and a transmitter array having 16 laser diodes without using a deflection apparatus for the transmission spatial angle and the visual spatial angle. A line scanner with depth resolution is so-to-say hereby realized without a scanning taking place in the actual sense, that is in the sense of a use of a deflection device, e.g. of a rotary mirror or a tilting mirror. The distance profile thus taken can already be used well for many applications. The fixing to 16 lasers and 64 ADPs and the covering of 4 individual visual spatial angles with one individual transmission spatial angle is selected as arbitrary or only exemplary, but meaningfully.

A limiting parameter is given in practice by the maximum pulse repetition rate (PRF) of pulse lasers with pulse semiconductor laser diodes. With pulse powers over 50 watts, a mean PRF of approximately only 20 kHz is possible, at least currently. During the breaks of each laser, measurements can be carried out with further lasers of the laser array. If a maximum working range (distance) of 400 m is assumed and if individual measurements are carried out, as already explained above, using each of the 16 lasers of the laser array in series as a so-called burst measurement, these 16 individual measurements will last, carried out sequentially, less than 50 μs, which corresponds precisely to the maximum mean PRF of the lasers of 20 kHz with a continuous distance profile taking. It follows directly from this that the time measurement IC would have to have no more than 4 time measuring channels (one laser "charges" 4 APDs of 64 APDs/16 lasers=4). The start pulses and signals are delivered in series in groups by means of multiplexers (18 and 19) to always the same four time measuring channels.

Generally, the following rules for the most varied embodiments of transmitter/receiver arrays and combinations thereof can be set up for the grouping of picture elements for a time measurement IC:

Distance picture elements arranged in linear form in a row and separated as spatial angle segments (149) (cf. FIG. 12a), in which a distinguishable coverage of the individual visual spatial angle and the individual transmission spatial angle is created, are unambiguously identifiable by the number of the transmitter n and the number of the receiver m, that is by the numbers (m, n).

Those distinguishable distance picture elements are grouped as a sub-group which receive the totally detectable radiation of a transmitter.

So many of these sub-groups are grouped to form a group (7a and 13a) (cf. FIG. 7) that the number of distinguishable distance picture elements belonging thereto is equal to or smaller than the number of independent time measuring channels.

If sufficient time measuring channels are not present, the groups are guided sequentially via multiplexers (18 and 19), the signals (7a) and start pulses (13a) belonging to a group together, in series into the time measuring channels of the time measurement IC (32).

If sufficient time measuring channels are present in the time measurement IC for all distance picture elements, the signals (7b) and start pulses (13b) belonging together are guided directly into the time measuring channels of the time measurement IC (32).

If pumped, high-power lasers are used with a substantially higher pulse power of e.g. 2.6 kW and if the pulses are spread optically by means of a cylindrical lens into a transmission spatial angle which corresponds to the visual spatial angle of 64 APDs, then 20 watts per ADP are available, which permits a range in the km range and 64 time measuring channels would be required in the time measurement IC to fully utilize the power of this laser. This configuration would be exceptionally suitable, for example, for a so-called terrain profiling from an aircraft because both the range and the repetition rate adopt assume larger values.

Starting from a distance profile taking using semiconductor laser diodes transmitting pulses at 20 kHz, the repetition rate can easily be determined at which distance images can be taken when a correspondingly fast deflection device is positioned in front of the optical systems. If one assumes for a deflection unit (50) (cf. e.g. FIG. 18) that pulses can be transmitted, as is e.g. possible with a 4 mirror polygon scanner with a 90° deflection angle, over 50% of the time, then with a deflection direction transverse to the longitudinal direction of the transmission spatial angle and visual spatial angle and at 100 distance profiles per distance image, 100 distance images per second with 64*100=6,400 picture elements can be taken. The measuring rate would lie at 640 kHz. This comparatively enormous measuring rate is achieved by 20 kHhz*0.5 time portion*16 lasers*4 APDs=640 kHz. In comparison with conventional sensors with only one laser and one receiver, a measuring frequency of only 5 kHz would be achievable because two deflection devices would be required and the time for the transmission of pulses is thus reduced to 25%.

Not even a distance image rate of one Hz could thus be achieved at 6,400 distance picture elements.

For a distance image repetition rate of 25 Hz at a measuring rate of 640 kHz, a fourfold averaging to increase accuracy or a doubling of the image width by a second deflection unit can take place and one would still achieve a distance image rate in the range of conventionally imaging cameras.

It must be considered with this system that the power of one laser diode is split onto a plurality of photodiodes. This can be avoided with a device in accordance with the invention which is basically the same in that only the dimensions of the individual transmission spatial angle and individual visual spatial angle and the optical systems are selected differently.

Figure 14:
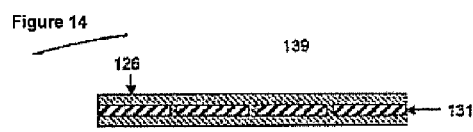
Figure 15:
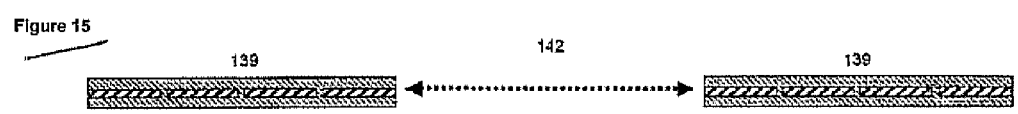

FIGS. 14 and 15 show the active zones (131) of the transmission elements and the active zones (126) of the reception elements of an apparatus in which the power of the laser diode is not split over a plurality of APDs, whereby the range is substantially increased. The active zone (126) of the APD array elements is expanded in linear form so that, with a suitable choice of the parameters of the optical systems, a plurality of individual transmission spatial angles include one individual visual spatial angle. The segment (139) can be expanded into an array (142). Intermediate solutions of these two systems can also be realized. A special case would be precisely one laser per APD. The rules set forth above for the group formation of distance image points for the time measurement IC apply to all aspects. In a yet further specialized case, only one laser and one receiver would be present and the visual spatial angle of the receiver includes the transmission spatial angle of the laser. This arrangement corresponds to a relatively simple distance sensor in accordance with the invention.

It is a question of the demands and of the costs as to which combination of transmitter and receiver arrays, which dimensions of the active zones and optical systems and which version of the time measurement ICs are used. Since the transmission and reception elements of the arrays have specific dimensions (availability on the market and physical reasons), configurations in accordance with FIGS. 12/13 are in particular used when an apparatus should have a high lateral resolution, but a comparatively low range and configurations in accordance with FIGS. 14/15 when an apparatus should have a large angular range with a low lateral resolution, but a comparatively large range. The type of the evaluation of the individual measurements remains substantially the same.

With the described receiver array with an APD array as the receiver element, an enormous signal travel is present, and indeed as a result of different reflectivities of the targets which lie in a range occurring in practice from 3% to 100% (factor 33). The signal has a dynamic factor overall of 33*10,000=330,000 at different distances from 2 to 200 m (factor 10,000 due to square dependency). Some of the signal light falls into the above-mentioned gaps, where—with large signals—small, but sufficient electrical interference pulses arise which superimpose themselves with the desired signals, which is a basic problem of the array technique.

Figure 16:
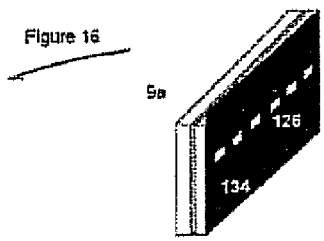

This effect can be dramatically reduced by a shadow mask (134) (cf. FIG. 16). The shadow mask (134) is designed such that only that light is transmitted which would also be incident on the active zones of the APDs. The shadow mask (134) is attached directly to the APD array, as FIG. 16 shows. The remaining light can be avoided in that the shadow mask is mirror coated superficially, with it thus being achieved that the unwanted light does not enter into the region of the active zones at all or in that the shadow mask is printed onto the cover plate of the APD array or onto an APD with impermeable material.

However, some of the light which passes through the holes of the shadow mask could be reflected by the APD and be reflected back from the lower side of the shadow mask and also still be scattered under certain circumstances. After approximately a two-fold reflection to and fro, this light would be able to reach the adjacent active zones and act as an interference signal there. This effect can be reduced in that the rear side of the carrier glass is provided with a layer of material absorbing signal light when the shadow mask is configured as a mirror layer. In addition, only the marginal light (approx. 10% of the signal light reflected back) would be incident on the rear side of the shadow mask. If the reflectivity of the ADP amounts to approx. 20% and the reflectivity of the absorbing material approximately 5%, a reduction of 10%* (20%*5%)2=10−5 results. This interference signal can therefore lie in the range of weak signals as a comparison with the above-mentioned dynamic range shows.

For this reason, in a further embodiment, the shadow mask (134) cannot be placed closely in front of the APD array (9a), but can rather be placed at an angle of e.g. 45° in the focal plane of the converging optical system (48) of the receiver array, with the shadow mask being imaged by means of a further lens (156) onto the ADP positioned behind it, as is shown in FIG. 17. Now, the light (158) reflected back when the absorbing layer is omitted is reflected by the lower side of the mirror coated layer of the shadow mask (134) on an absorber disposed further distant and is destroyed there. It is therefor possible in this manner to isolate the sensor elements effectively from one another optically with the help of such a shadow mask (134).

FIG. 17 shows a further substantial advantage of the shadow mask. When the shadow mask (134) is positioned in the focal plane, signals of targets located in the near working range of the apparatus and therefore reflecting strong signals are imaged behind the focal plane. The image of the signals in the focal plane is thereby significantly enlarged so that only a fraction of these signals is incident through the holes of the shadow mask.

If the dimensioning of the holes is adapted to the imaging size for the maximum working range, the signal dynamics can be reduced by a factor of 10 by the reduction of signals in the near range. This effect can be utilized in both cases (positioning of the shadow mask directly in front of the APD array or at 45% with imaging onto the ADP array). The shadow mask with a mirror coated layer and set obliquely at 45° is furthermore suitable as a geometrical splitter for the use of two APD arrays for the manufacture of a tight visual spatial angle, as is described further above.

In an analog manner, this form of use of the shadow mask would be suitable for the combination of two laser diode arrays for the production of a tight transmission spatial angle. The distance picture element number in the example described above can thereby be increased to 12,800. This increase then does not have to result in a reduction in the distance image rate if twice the number of time measuring channels is present in the time measurement IC and the multiplexers are expanded accordingly. In this embodiment of the apparatus, the time measurement IC then has 8 time measuring channels and the multiplexers "charge" 2 times 4 time measuring channels in parallel.

The time measurement circuit suitable for the arrays of the sensor and transmission elements is preferably manufactured as an integrated IC e.g. in CMOS. Distance profiles can thus be taken without a deflection unit and distance images in combination with only one single deflection unit. A particularly suitable time measuring method is described in the said KEM patent application. The realization of a time measuring method such as is in particular described in the KEM patent application in a time measurement IC having circuits in accordance with the invention for the measuring channels and arrangements of components such as are described in the present application is particularly effective for the distance image taking.

In accordance with the invention, an apparatus for the distance profile taking (2D) can be extended by means of deflection units to an apparatus for a wider distance profile taking (2D with larger angular range) or to an apparatus for a distance image taking (3D). Both the distance profile and the distance image are basically independent of the type of the deflection unit used for the deflection of the transmission spatial angle and visual spatial angle.

Figure 18:
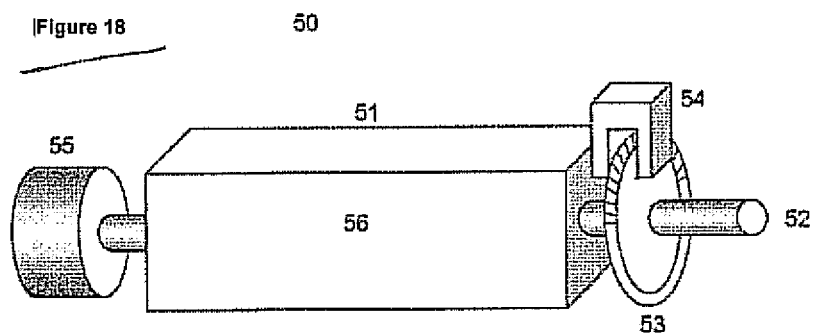

FIG. 18 shows a deflection unit in which a polygon mirror (51) rotates about an axis of rotation (52) with the help of a drive motor (55) and the angle of rotation is detected by means of an angular measuring device such as a code wheel (53) with an angle reader (54). As polygons, two, four or six mirror surfaces (56) can, for example, be combined to a polygon (51), with two surfaces corresponding to a two-sided mirror. This deflection unit will be called a polygon deflection unit (50) in the following.

Two of these polygon deflection units can be mounted transversely to one another and so be combined to form a deflection unit called a 3D polygon deflection unit.

FIG. (20) shows the assembly of the apparatus for distance profile taking instead of the telescope in an automatic theodolite. Here, automatically means that the horizontal axis and vertical axis of the theodolite are driven by a motor and a spatial angle can be traveled through in series within a presettable angular range. In this context, the movement is controlled such that a distance image arises which is uniformly filled with distance picture elements. This type of deflection unit is called a theodolite deflection unit.

Figure 19:
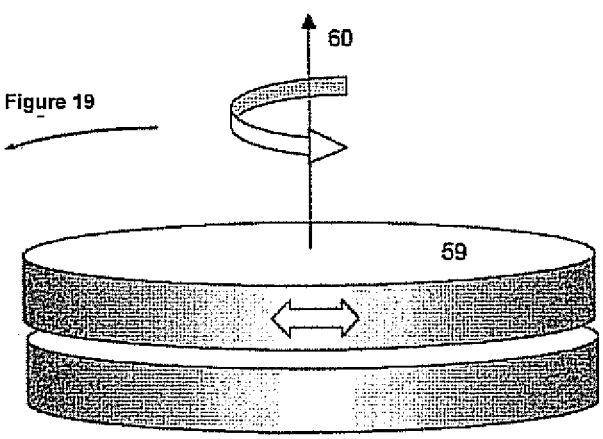
Figure 20:
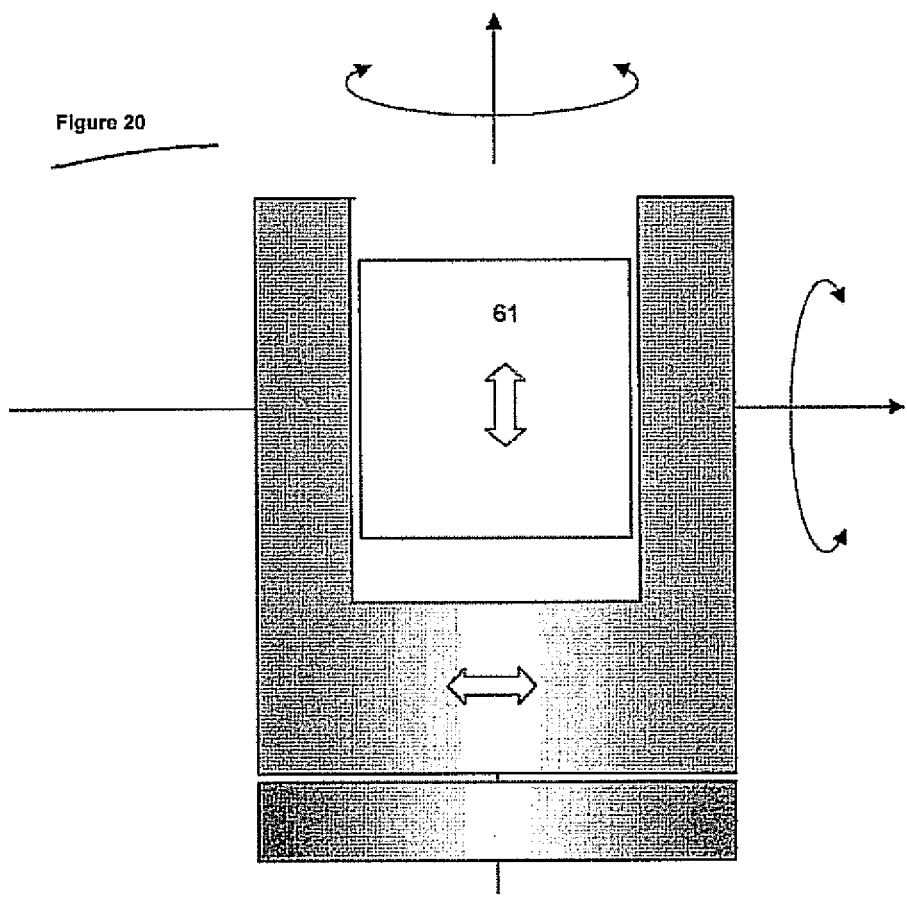

FIG. (21) shows the combination of polygon deflection unit for the vertical deflection with a rotation around the vertical axis by means of a turntable (59) such as is shown in FIG. 19 for the horizontal deflection. This deflection unit is called a turntable/polygon deflection unit.

Furthermore, the deflection directions can take place in the direction of the transmission spatial angle or of the visual spatial angle or transversely thereto, as shown in the FIGS. (21 and 22). A deflection in the direction of the transmission spatial angle and the visual spatial angle (longitudinal deflection (63)) results in longer distance profiles (2D) FIG. 21), whereas a deflection transversely to the direction of the transmission spatial angle and the visual spatial angle (transverse deflection (62)) results in distance images (3D) (FIG. 22).

One moves from apparatus for the taking of distance profiles to apparatus for the talking of distance images by a combination of the apparatus for distance profile taking with deflection units known per se for the pivoting of the transmission spatial angle and visual spatial angle in the array direction or transversely thereto and also by mounting of the apparatus on moving carriers and moving the transmission spatial angle and visual spatial angle in the array direction or transversely thereto and pivoting the transmission spatial angle and visual spatial angle in the array direction and transversely thereto. The most varied apparatus and systems for the distance image taking result which are admittedly suitable for respectively different applications, but which are largely the same in basic design and in their block diagrams. The moved carriers are, for example, vehicles, cranes, mobile working plant, helicopters or aircraft.

In the following, special versions of these devices for image taking are described with specific applications purely by way of example.

Figure 21:
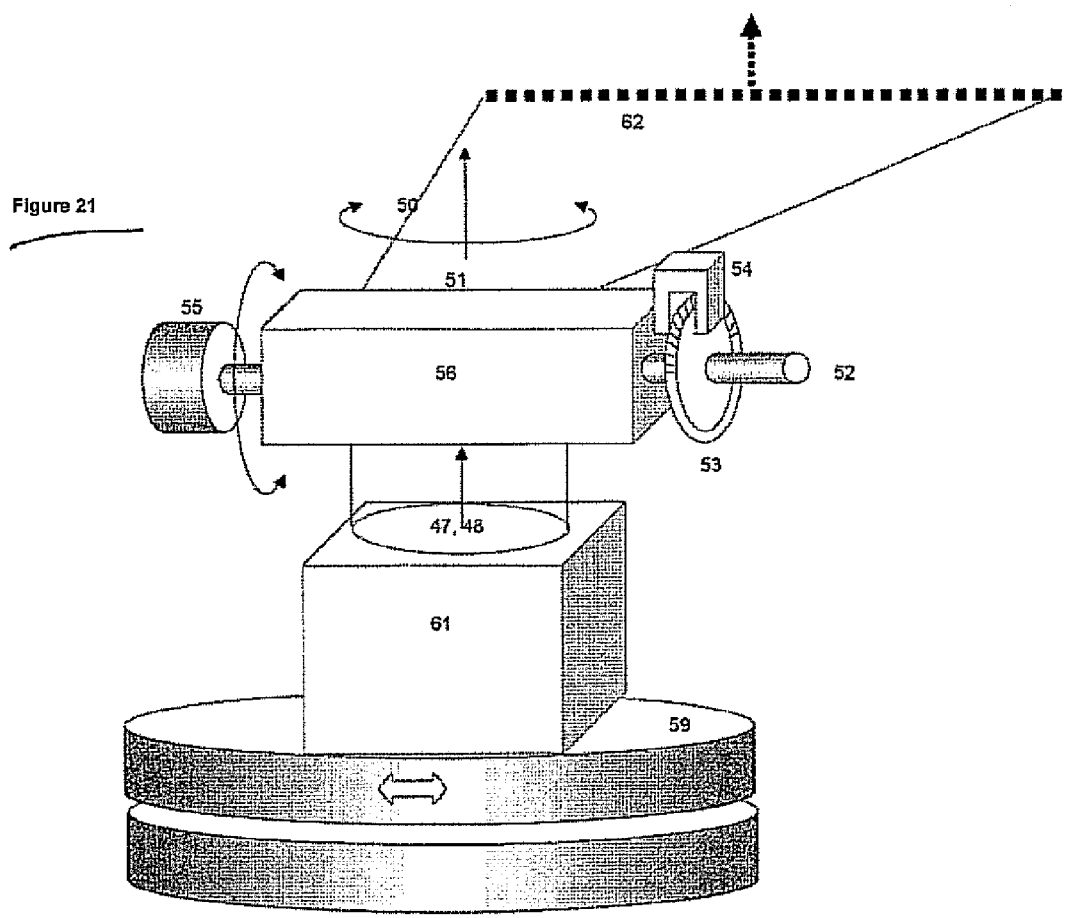
Figure 22:
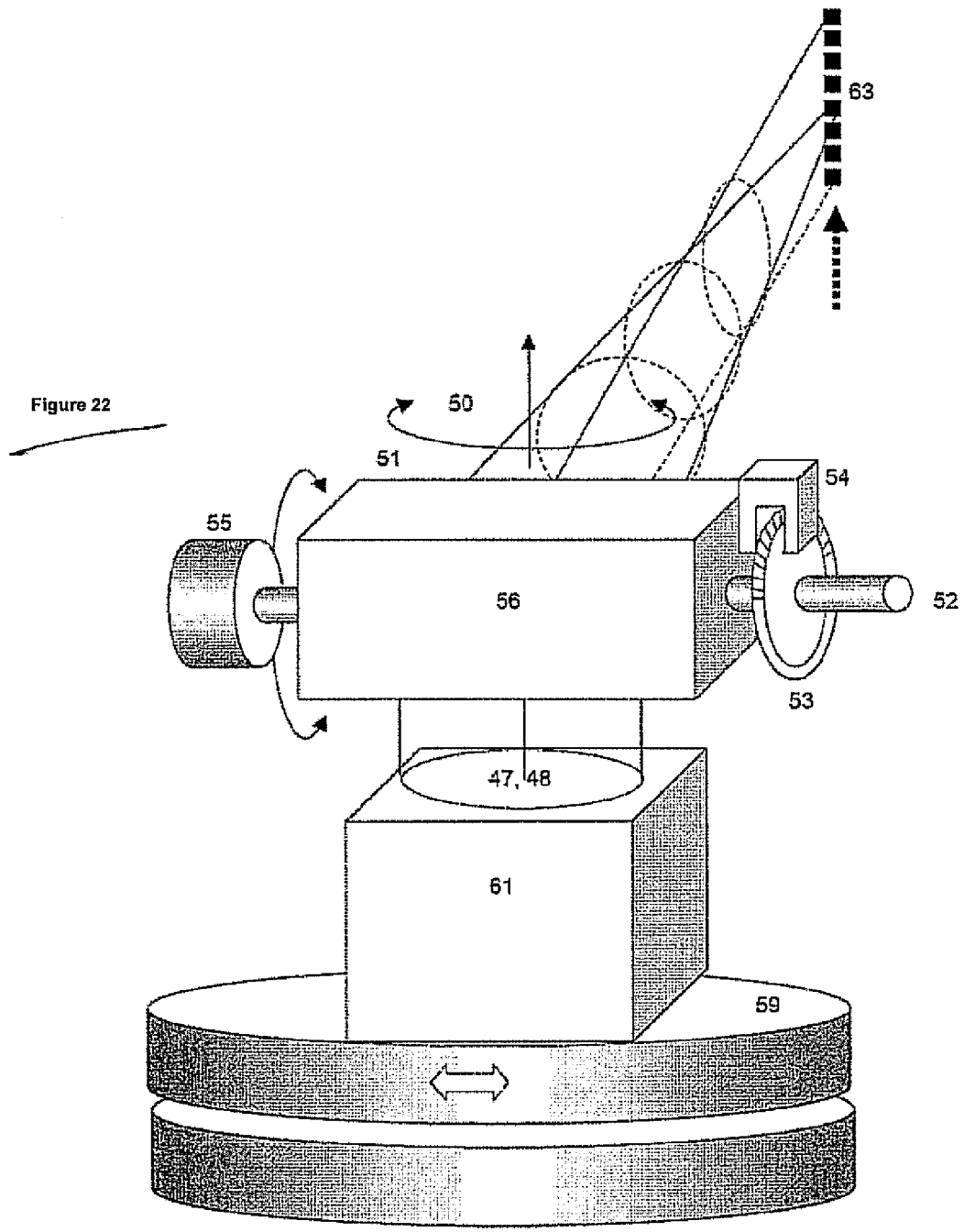

FIG. 21 shows an apparatus (61) in combination with a polygon deflection unit (50) and a turntable (59) for panorama distance image talking. Vertically aligned distance image strips can be used for an all-round distance image, e.g. inside a quarry, a strip mine operation, a building site or a valley.

FIG. 22 shows basically the same apparatus in which the transmission spatial angle and the visual spatial angle are aligned vertically in the deflection direction. This apparatus is suitable in particular for large vertical spatial angles of the distance image. In a particular aspect of the shadow mask having hole dimensions which are n-fold smaller than the pitch (132) of the APD array (cf. e.g. FIG. 9) and with n lasers which transmit in the same individual transmission spatial angle, this apparatus is suitable for the fast taking of vertically orientated distance profiles with n-fold higher lateral resolution.

Figure 23:
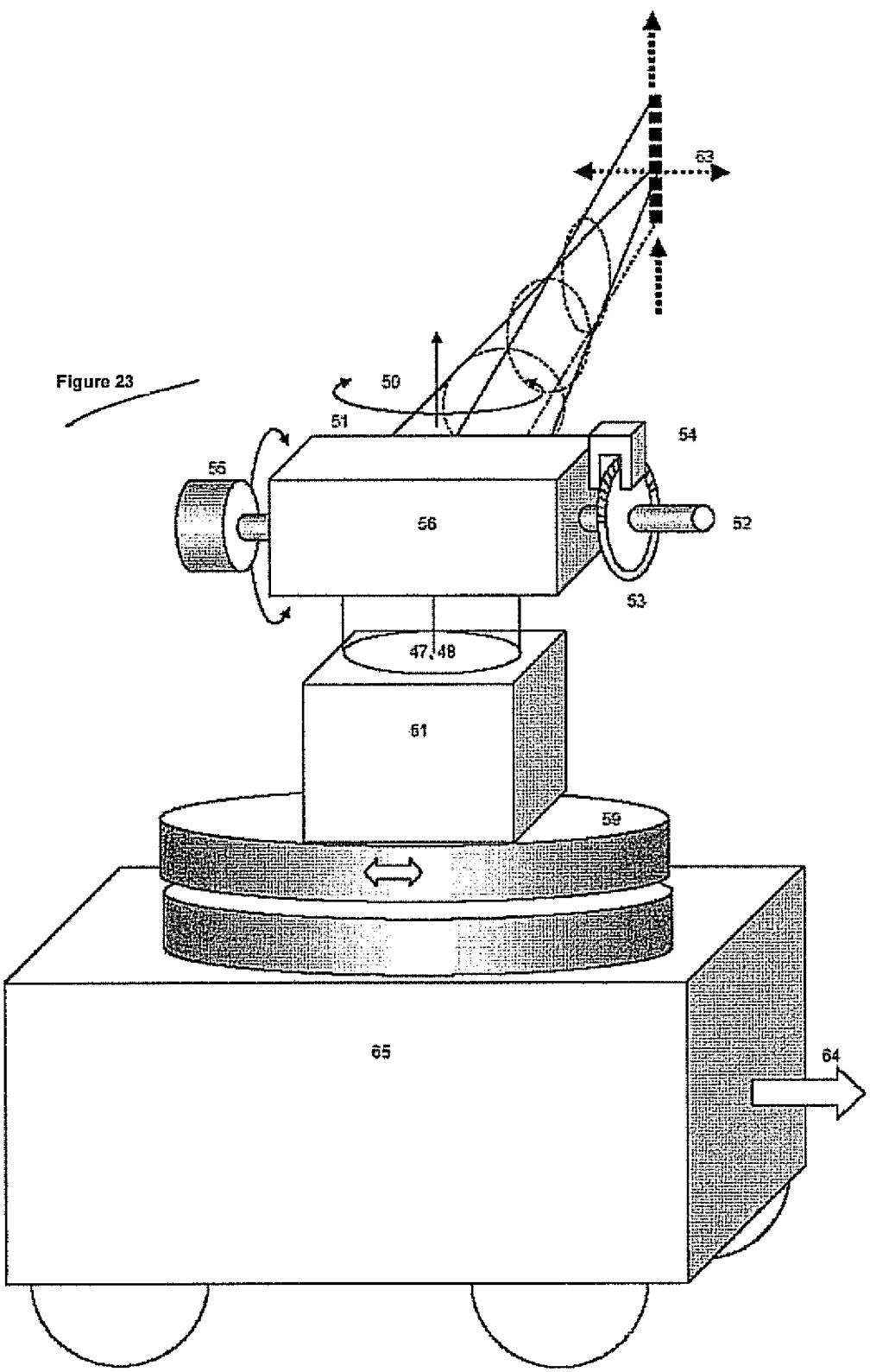

FIG. 23 shows the apparatus of FIG. 22, but here mounted on a carrier vehicle (65) with traveling direction (64). When the carrier vehicle (65) is in motion and distance profiles orientated vertically and perpendicularly to the direction of travel are taken during the trip, all the distance profiles combine to form a surrounding distance image in cylinder coordinates. The oppositely disposed side of the surroundings can be taken using a further apparatus (61) mounted above the deflection unit (50). Panorama distance images can also be taken along a travel path using the turntable (59) at discrete points with a stationary carrier vehicle. This type of distance image taking is in particular suited for a measurement of cities because objects to the left and right of the roads are measured at different angles and sides which are orientated at angles to the road are thus also detected.

Figure 24:
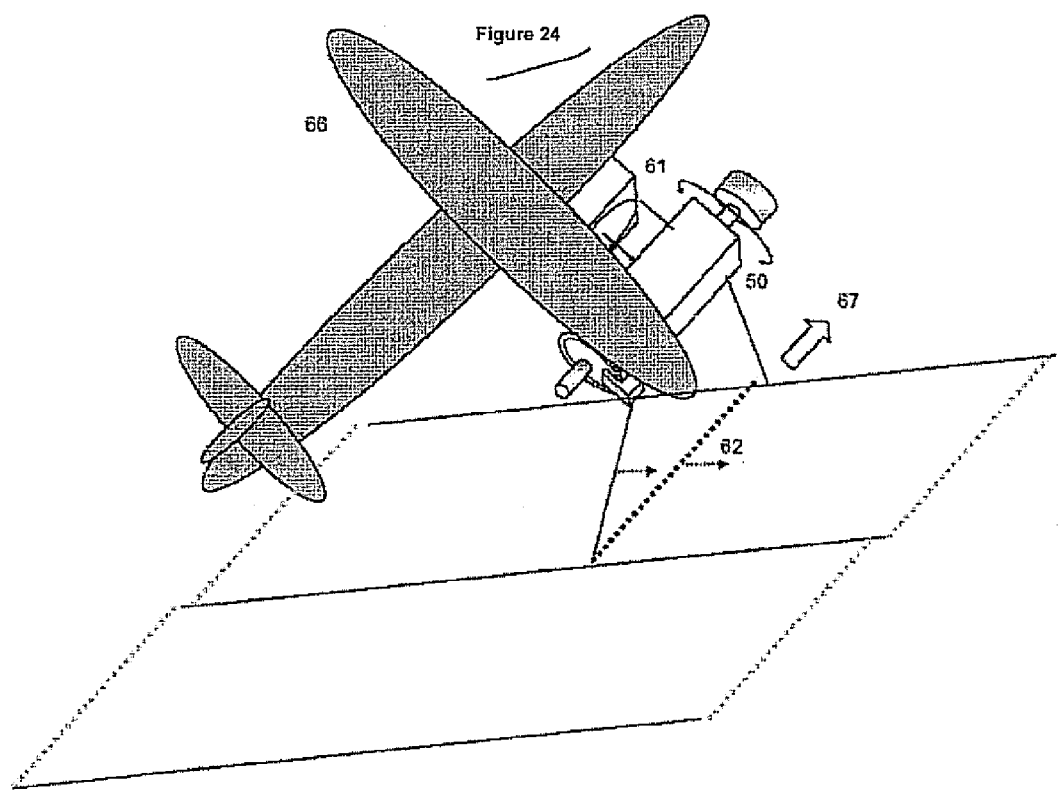

FIG. 24 shows an apparatus in accordance with FIG. 21, but without a turntable, but mounted beneath an aircraft (66), and indeed with vertical or transverse deflection (62) as well as with a transmission angle alignment and visual spatial alignment in the direction of flight (67). With this arrangement, one is capable of taking an endless distance image of the terrain flown over. The high measuring speed of the apparatus in accordance with the invention permits a distance image taking even at high flight speeds.

Figure 25:
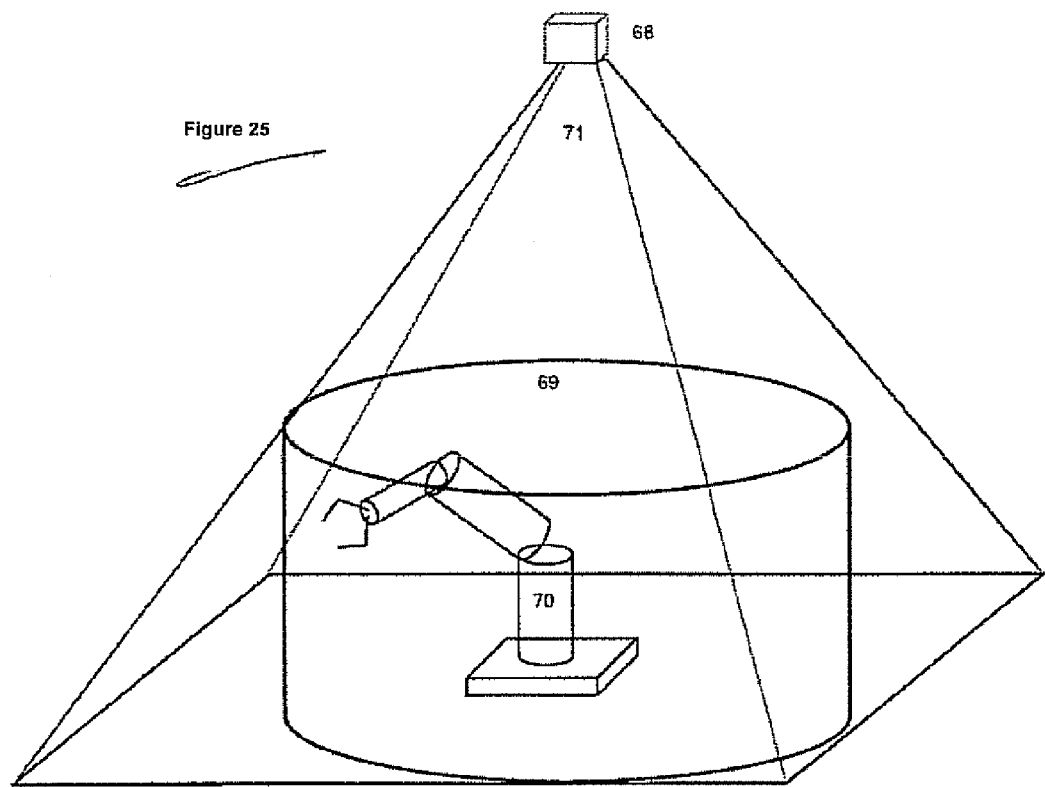

FIG. 25 shows an apparatus (68) for distance profile talking in combination with a 31) polygon deflection unit comprising two polygon deflection units (50) arranged perpendicular to one another. With this apparatus, a distance image can be taken at high speed at a spatial angle (71). If the spatial angle can be smaller, a single polygon deflection unit (50) would also suffice. A safety volume (69) is defined within the spatial angle (71). If an object is detected inside this safety volume (69), a signal is generated with which a working plant (70) is stopped.

Figure 26:
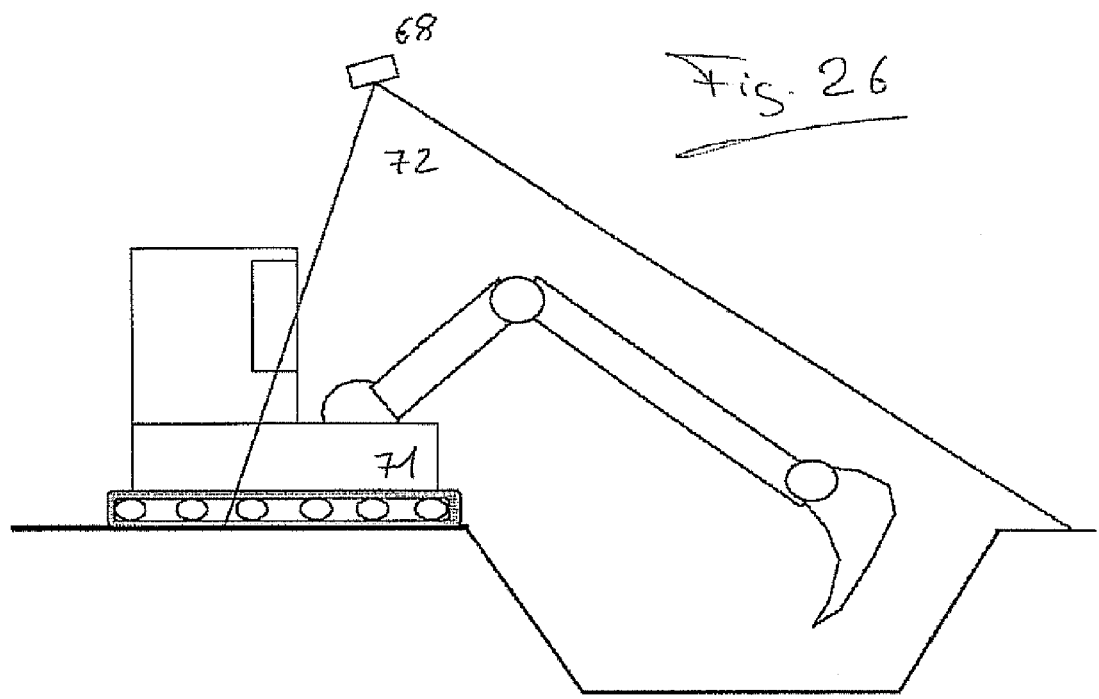

FIG. 26 shows an apparatus (68) for distance profile taking in combination with a 3D polygon deflection unit comprising two polygon deflection units (50) arranged perpendicular to one another. A distance image can be taken with this apparatus at a high speed at a spatial angle (72) in the working zone of a working plant (70) adding or removing material. The distance images are evaluated in accordance with the working targets of the working plant (70) and are used suitably for the control of the working plant (70).

Figure 11:
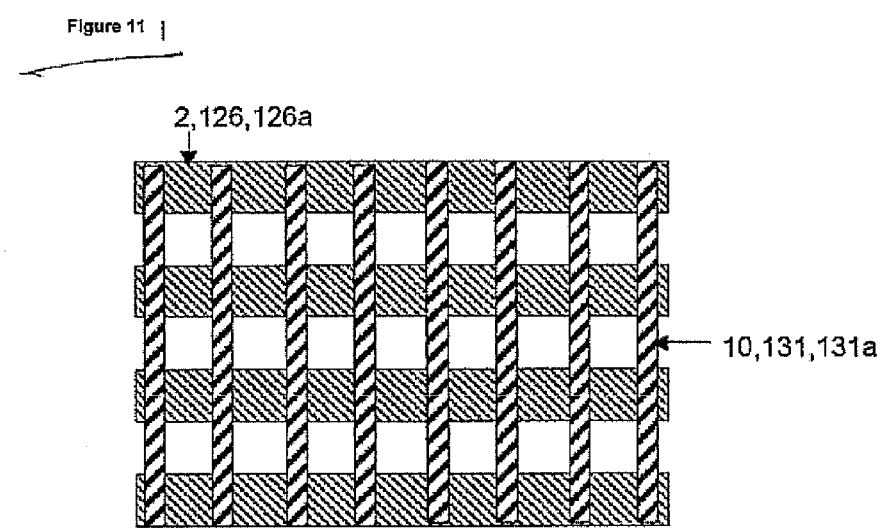

In accordance with a further embodiment of the invention, FIG. 11 shows a further possible arrangement of the receivers (2) (e.g. APDs) and transmitters (10) (e.g. laser diodes) or of the active detection surfaces 126 or individual visual spatial angles 126*a* of the receivers (simply "receivers" in the following) and of the active zones 131 or individual transmission spatial angles 131*a* of the transmitters (simply "transmitters" in the following). The receivers are configured stretched in a first direction and lie in a "stacked" arrangement over one another in a second direction extending perpendicular to the first direction. A plurality of sensors disposed parallel to one another are arranged over their width, that is in the direction of their longitudinal extent, and are likewise stretched and respectively cover all the APD array elements (receivers), with the longitudinal extent of the transmitters being rotated by 90° with respect to the longitudinal extent of the receivers. The transmitters are triggered in series, and indeed in each case after the expiration of the maximum TOF. This arrangement can be continued by repetition in the direction of the longitudinal extent of the receivers and/or transmitters. If the arrangement is moved in space by means of one or more deflection units, the trigger time for the transmitters can be set such that a tight arrangement of distance picture elements results in every angular direction of the deflection. In the arrangement shown in FIG. 11, 4×8=32 picture elements result.

Generally, therefore, a matrix-like or grid-like structure can be provided of receivers/detection surfaces/individual visual spatial angles parallel to one another and elongated and of transmitters/transmission surfaces/individual transmission spatial angles extending transversely thereto, parallel to one another and elongated, with the transmitters preferably being operated in series. This matrix structure or grid structure is basically no longer a "line scanner" such as was mentioned once above, but can already be called a "3D camera with depth resolution" since an areal distribution of a relevant number of picture elements is realized. By moving this "mini distance image camera" in space by means of one or more deflection units, larger images can be taken—with a sufficiently high image repetition rate—i.e. images which have a sufficiently high number of picture elements.

Further possible embodiments of the invention will be named in the following:

Provision can be made in accordance with the invention that two or more comparators (4) whose reference (5) is set at differently high levels are connected after a receiver amplifier (3); and a time measuring channel is made available for each comparator output in which the points in time of all events of a comparator output with the associated start pulse event are measured.

Provision can furthermore be made in accordance with the invention that the deflection units (50) in each case comprise a polygon mirror (51) driven by a motor (55) and rotating around an axis of rotation (52) and mounted with all mirror polygon surfaces (56) parallel and centrally to the axis of rotation and an angle measuring device (53 and 54) for the measurement of the deflection angle.

Provision can furthermore be made in accordance with the invention that at least one of the deflection units is made as an electronically controllable MEMS mirror scanner with a controllable deflection direction (MEMS=microelectro-mechanical system).

Provision can furthermore be made in accordance with the invention that two deflection units are made as electronically controllable MEMS mirror scanners.

Provision can furthermore be made in accordance with the invention that the deflection units are made as an electronically controllable theodolite deflection unit with a motor driven and controllable vertical and horizontal axis.

Provision can furthermore be made in accordance with the invention that the first deflection unit is made as a controllable polygon deflection unit (50);

the second deflection unit is made as an electronically controllable turntable (59).

Provision can furthermore be made in accordance with the invention that semiconductor laser diodes having one or more linear active zones are used as the transmission elements (10).

Provision can furthermore be made in accordance with the invention that the semiconductor laser diodes are made as a laser array in the form of a laser diode bar or strip in which the active zones form a line interrupted by gaps.

Provision can furthermore be made in accordance with the invention that the generation of a linear pulsed laser beam takes place with a solid laser pumped using semiconductor laser diodes whose almost parallel radiation is expanded by means of a cylindrical lens to form a projected linear spatial angle.

Provision can furthermore be made in accordance with the invention that the generation of a linear pulsed laser beam takes place by means of a Raman laser whose almost parallel radiation is expanded by means of a cylindrical lens to form a projected linear spatial angle.

Provision can furthermore be made in accordance with the invention that the generation of a linear pulsed laser beam takes place using a semiconductor CW laser diode operated in a pulsed manner.

Provision can furthermore be made in accordance with the invention that the array of the transmission elements comprises LEDs arranged in a linear manner in series.

Provision can furthermore be made in accordance with the invention that imaging optical lens systems are used as the projection system (47) and/or the converging radiation system (48).

Provision can furthermore be made in accordance with the invention that the projection system of the laser array (16*a*) includes an array of projection lenses;

each laser (15*a*) of the transmitter array (16*a*) has its own projection lens whose individual transmission spatial angles (131*a*) combine to form a linear transmission spatial angle (130*a*);

whose active zones are in particular set obliquely relative to the array alignment;

a lens is in each case associated with a transmitter module (15*a*);

the lenses can in particular be GRIN lenses.

Provision can furthermore be made in accordance with the invention that each APD of the APD array (125) is aligned obliquely relative to the array alignment so that a gap-less APD array is formed transversely to the array direction.

Provision can furthermore be made in accordance with the invention that
- a shadow mask (34) is connected before the APD array (125);
- each APD element of the APD array can be reached through a hole of one of the holes of the shadow mask by the reflected light from the associated individual visual spatial angle (126*a*);
- the shadow mask (134) is positioned in the focal plane of the converging radiation system (48);
- the shapes of the holes are rectangular;
- in particular the dimensions of the holes are each smaller than the dimensions of the active surface of an APD array element;
- in particular the dimensions are n-fold smaller than the pitch of the active surfaces of an APD array, with n being able to be a whole number.

Provision can furthermore be made in accordance with the invention that the shadow mask
- is transparent in the region of the holes;
- is mirror coated outside the holes, viewed in the reception direction, and is not transparent for the light used;
- is in particular provided with a greatly reflection-reducing layer, viewed from the APD array side.

Provision can furthermore be made in accordance with the invention that
- the shadow mask (134) is printed onto the cover plate of the APD array;
- the printing material greatly absorbs the laser radiation used.

Provision can furthermore be made in accordance with the invention that
- the holes of the shadow mask in the APD array alignment are n-fold smaller than the pitch of the APD elements of the APD array;
- n lasers are aligned to the same individual visual spatial angle:
- the lasers are triggered serially such that the individual visual angles reduced in size by the shadow mask during the deflection combine serially to form a closed pattern.

Provision can furthermore be made in accordance with the invention that
- two receiver arrays (9) are used, each with an APD array as the receiver element array
- which are charged with the reflected light via a respective lens disposed after the shadow mask
- by means of mirror coated shadow masks standing obliquely in the focal plane of the converging radiation system as a geometrical beam splitter
- and the two APD arrays are adjusted such that the individual visual spatial angles of both APD arrays combine to form a tight linear spatial angle.

Provision can furthermore be made in accordance with the invention that
- two transmitter arrays with laser array bars are used as the transmitter elements
- with which two channels are formed by means of a mirror-coated, obliquely standing shadow mask (134) disposed in the focal surface of the optical projection system (47) as a geometrical beam splitter
- in which two channels a lens (156) is respectively disposed after the shadow mask and the light of the laser array bars is imaged on the shadow mask with said lens;
- the laser array bars are adjusted such that the individual transmission spatial angles of both bars combine to form a gap-less linear transmission spatial angle.

Provision can furthermore be made in accordance with the invention that
- one or more of the apparatus are mounted beneath an airworthy carrier
- whose linear visual and transmission spatial angles combine transversely to the flight direction to form a wide spatial angle which is downwardly aligned;
- distance profiles of the ground are continuously taken and stored;
- in particular a plurality of the distance profiles are averaged to form a distance profile;
- the distance profiles are assembled to form a distance image of the ground surface.

Provision can furthermore be made in accordance with the invention that
- one or more of the apparatus are mounted underneath at an airworthy carrier;
- the linear visual and transmission spatial angles combine in the direction of flight to form a wide spatial angle aligned downwardly;
- the transmission and visual spatial angles are continuously deflected transversely to the direction of flight using a deflection unit;
- distance image strips disposed transversely to the direction of flight are taken and stored;
- in particular the distance image strips overlap in the direction of flight;
- the distance image strips are assembled to form a distance image of the ground surface.

Provision can furthermore be made in accordance with the invention that
- one or more of the apparatus are mounted on a vehicle (65);
- the linear visual and transmission spatial angles are aligned perpendicular to the direction of travel (64);
- are deflected into visual and transmission spatial angles by means of the deflection unit (50);
- distance profiles of the surroundings of the vehicle are taken and stored continuously during the trip
- whose alignment is fixed horizontally not equal to 90° to the direction of travel
- and which are assembled to form a distance image of the surroundings of the vehicle.

Provision can furthermore be made in accordance with the invention that
- when stationary, the image talking apparatus is rotated around the vertical axis by rotating a turntable;
- distance profiles are continuously taken and stored;
- the distance profiles are assembled to form a distance image in spherical coordinates of the surrounding of the vehicle.

Provision can furthermore be made in accordance with the invention that
- in each case n lasers are aligned to the same individual visual spatial angle;
- the n lasers are triggered serially such that the individual visual angles reduced in size by the shadow mask during the deflection combine serially to form a closed pattern;
- distance profiles are measured with n-fold higher resolution;
- the distance profiles are assembled to form distance images of the environment.

Provision can furthermore be made in accordance with the invention that
- boundary coordinates of a spatial angular region are input;

the associated distance image is taken and stored by sweeping over the pre-set spatial angular region.

Provision can furthermore be made in accordance with the invention that transmission and visual spatial angles are horizontally aligned;

the apparatus is rotated by a motor around a vertical axis of rotation using a turntable;

boundary coordinates of a spatial angular region are input;

the associated distance image is taken and stored by sweeping over the pre-set spatial angular region.

Provision can furthermore be made in accordance with the invention that the apparatus is connected to a working plant (70) removing or applying material; the working spatial angle (72) of the apparatus is aligned to the working range of the working plant;

distance images of the current working zone are taken continuously;

surface coordinates of a comparison surface are input;

the distance images are evaluated corresponding to the working targets of the plant;

the plant is controlled in accordance with the evaluation results.

Provision can furthermore be made in accordance with the invention that the apparatus is mounted above one or more working plant;

the spatial angle of the apparatus in which distance images can be taken is aligned onto a movement zone of the working plant(s) to be monitored;

the spatial angle is selected to be larger than the movement zone of the work plant to be monitored;

distance images are taken continuously;

3-dimensional safety volumes are pre-defined and stored;

the distance images are evaluated as to whether an object intrudes or has intruded so far into the spatial angle monitored by the apparatus that it is detected in the defined safety volume;

a signal is derived on detection of an object in the safety volume;

the signal is used for the switching off of one or more working plan or for the restriction of the movement zones of the work plant.

Provision can furthermore be made in accordance with the invention that the spatial angle in which the distance profile or distance image is taken is additionally taken with a CCD camera;

the information on color, brightness, distance, power and/or pulse width is combined to form a piece of distance image information.

The invention claimed is:

1. A method for the taking of a large number of distance images comprising distance picture elements, wherein electromagnetic radiation is transmitted in each case in the form of transmission pulses (14) using a plurality of transmitters (15) arranged in an array (130) for each distance image to be taken and reflected echo pulses (1) are detected using a plurality of receivers (2) arranged in an array (125), with the respective distances of objects at which the transmission pulses (14) are reflected and which form a distance picture element being measured by determining the pulse time of flight;

wherein a plurality of individual measurements are carried out using a time measuring device connected after the receiver array (125) for each distance image to be taken, in which individual measurements a respective pulse chain is processed which includes a logical start pulse (73) derived from the respective transmission pulse (14) and at least one logical receiver pulse (79) formed from an echo pulse (1) or a noise pulse (76);

wherein the logical receiver pulses (79) are each generated by means of at least one reference (5) of the receiver (2), the reference being broken through by the underlying echo pulses or noise pulses, with an exceeding of the reference (5) forming the positive flank of the receiver pulse defining an up event (81) and a falling below of the reference forming the negative flank of the receiver pulse defining a down event (82);

wherein, for each distance image to be taken, the respective pulse chains (80) are formed in that the logical start pulses (73) and the logical receiver pulses (79) are each combined at a right time;

the respective pulse chains (80) formed in this manner are distributed onto an array of time measuring channels formed by the time measuring device in accordance with a pre-settable measurement procedure; and, for each time measuring channel, time durations are determined which, with reference in each case to a point in time before the start pulse (73), pass up to a receiver pulse (79) in that, for each up event (81) and/or for each down event (82), at least the respective clock pulses are counted which are made available by a central clock (33) at a known frequency; and the counter results are stored as an event list in an arrangement taking account of their respective time information;

and wherein the stored event lists of all time measuring channels are read out and evaluated in order to convert the respective time information contained in the event lists into distance values corresponding to the distance picture elements.

2. A method in accordance with claim 1, characterized in that the references (5) of the receivers (2) are each disposed in the noise so that the logical receiver pulses (79) refer back to echo pulses and noise pulses.

3. A method in accordance with claim 1, characterized in that the processing of receiver pulses (79) is in each case suppressed until a pre-settable point in time after the logical start pulse (73) and the logical start pulse (73) is placed into the time gap arising thereby at the correct time on the formation of the respective pulse chain (80).

4. A method in accordance with claim 1, characterized in that each time measuring channel is split into two branches, with the up events (81) being measured in the one branch and the down events (82) being measured in the other branch.

5. A method in accordance with claim 1, characterized in that, for the determination of the time durations, in each case both whole periods of the clock pulses which have passed are counted and a part period (85, 88) counted too much up to the point in time of the up-event (81) and/or counted too much up to the point in time of the down event (82) are determined so that two partial results are obtained for each up event (81) and/or for each down event (82).

6. A method in accordance with claim 5, characterized in that the part periods (85, 88) are measured by means of time to digital converters, TDCs; and/or in that part periods (85, 86) are each measured as multiples of a pre-set delay time so that a first counter result indicating the number of passed whole clock pulse periods is obtained and a second counter result indicating the number of passed delay times in a part period (85, 88) is obtained for each up event (81) and/or for each down event (82).

7. A method in accordance with claim 6, characterized in that the delay time is calibrated with respect to the period of the central clock (33) for the compensation of unwanted changes in the pre-set delay time.

8. A method in accordance with claim 1, characterized in that a number of time measuring channels is provided for each distance image to be taken, said number being smaller than the number of respective pulse chains (80) to be processed; and in that the pulse chains (80) to be processed are supplied to the time measuring channels sequentially in groups.

9. A method in accordance with claim 1, characterized in that the pulses of the respective pulse chain (80) are distributed to a plurality of time measuring channels so that at least two pulses of the pulse chain (80) are processed in different time measuring channels.

10. A method in accordance with claim 1, characterized in that the respective pulse chain (80) is processed in parallel in a plurality of time measuring channels, with the clock pulses of the central clock (33) preferably being supplied to the time measuring channels in a phase shifted manner.

11. A method in accordance with claim 1, characterized in that in each case a plurality of individual measurements originating from the same transmitter/receiver pair and thus relating to the same distance picture element are processed together like an individual measurement for the carrying out of "burst" measurements, but are treated separately again in an evaluation following the processing.

12. A method in accordance with claim 1, characterized in that in particular when noise pulses (76) are present in addition to echo pulses (1) due to correspondingly set receiver references (5), in particular set to a value above 4.5 NEP, a plurality of individual measurements are averaged which originate sequentially from the same transmitter/receiver pair and thus relate to the same distance picture element.

13. A method in accordance with claim 1, characterized in that, in particular in the case of "burst" measurements, for the averaging of the individual measurements at least one time pattern memory is made available which is divided into a plurality of memory cells with which a time window is associated;

with a time window corresponding to the duration of a whole clock pulse of the central clock (33) or to the duration of a delay time and the clock pulses and part periods (85, 88) are respectively measured as their multiples;

the event lists of the individual measurements are transmitted sequentially into the same time pattern memory in that an up event (81) is evaluated as positive and a down event (82) is evaluated as negative, or vice versa;

the number of break-throughs of the receiver reference (5) is accumulated for each time window on the averaging.

14. A method in accordance with claim 13, characterized in that, subsequently to the averaging of the individual measurements, the content of the time pattern memory is integrated to an amplitude function and a detection threshold is applied to the amplitude function; and in that the associated object distance is in each case determined in the amplitude function for the echo pulses (1) on the basis of at least one point in time at which the detection threshold is broken through.

15. A method in accordance with claim 13, characterized in that the pulse width representing a measure for the power of the corresponding echo pulse (1) is used for the error compensation in the amplitude function, in particular by correction of the point in time at which the detection threshold is exceeded.

16. A method in accordance with claim 13, characterized in that a rough amplitude function is determined in that an integration is only carried out for count values of the time pattern memory which in each case represent a number of passed clock pulses; in that special part ranges going back to echo pulses are identified with reference to the rough amplitude function; and in that an integration of the content of the time pattern memory is carried out only for the identified part ranges for the amplitude function.

17. A method in accordance with claim 14, characterized in that the detection threshold is set in dependence on the receiver reference (5), in particular in dependence on the measure of a reduction of the receiver reference (5) with respect to a value of 4.5 NEP.

18. A method in accordance with claim 1, characterized in that the reference (5) of at least one receiver (2) changes, in dependence on the distances measured with the receiver (2).

19. A method in accordance with claim 1, characterized in that the transmitters (15) of the transmitter array (130) each transmit the transmitted radiation in an individual transmission spatial angle (131*a*) and the individual transmission spatial angles (131*a*) combine to form a total transmission spatial angle (130*a*); and in that the receivers (2) of the receiver array (125) each receive the reflected radiation from an individual reception spatial angle (126*a*) and the individual reception spatial angles (126*a*) combine to form a total reception spatial angle (125*a*), with the total reception spatial angle (125*a*) including the total transmission spatial angle (130*a*) and overlaps of the individual reception spatial angles (126*a*) and individual transmitter spatial angles (131*a*) being present which can be distinguished from one another, with each overlap corresponding to a distance picture element; and in that the overlaps are grouped for the measurement in the time measuring device for the formation of distance picture elements which can be distinguished from one another.

20. A method in accordance with claim 19, characterized in that the grouping takes place in a spatial and/or temporal respect; with, in the case of an overlap of a plurality of individual reception spatial angles (126*a*) with an individual transmission spatial angle (131*a*), a spatial grouping taking place and the associated receivers (2) working in parallel in time; and with, in the case of an overlap of an individual reception spatial angle (126*a*) with a plurality of individual transmission spatial angles (131*a*), a temporal grouping taking place and the associated transmitters being activated sequentially in time.

21. A method in accordance with claim 19, characterized in that those distinguishable distance picture elements which represent the totally detectable radiation of a transmitter (15) are grouped to form a sub-group; and in that so many sub-groups are grouped to form a group that the number of the distinguishable distance picture elements present in the group is at most equal to the number of time measuring channels of the time measuring device.

22. A method in accordance with claim 19, characterized in that, in dependence on the relationship of the number of the totally present distinguishable distance picture elements and the number of the time measuring channels, the groups in the time measuring channels are processed sequentially, when the number of the time measuring channels for the totally present distinguishable distance picture elements is insufficient; or in parallel, when sufficient time measuring channels are present for the totally present distinguishable distance picture elements.

23. A method in accordance with claim 1, characterized in that the receivers are masked.

24. A method in accordance with claim 1, characterized in that a shadow mask (134) disposed in front of the receivers (2) is arranged in the focal plane of an optical projection system (47) of the receivers (2).

25. A method in accordance with claim 1, characterized in that a taking surface formed by the distance picture elements is moved in space and a hole of a shadow mask (134) disposed in front is associated with each receiver (2), said hole being smaller in the direction of movement of the taking surface than the receiver (2) with a plurality of transmitters (15) being associated with the receiver (2) to increase the resolution, said transmitters being activated sequentially corresponding to the movement of the taking surface.

26. A method in accordance with claim 23, characterized in that the receivers (2) are in each case larger in the direction of movement of the taking surface by a whole number multiple than the holes of the shadow mask (134) disposed in front and the number of the transmitters (15) respectively associated with the receivers (2) is equal to this whole number multiple.

27. A method in accordance with claim 1, characterized in that a plurality of transmitter partial arrays and/or a plurality of receiver partial arrays are assembled by means of a shadow mask (134) such that gaps (128, 133) present between the transmitters (15), in particular the active transmission surfaces (131) of the transmitters (15), and/or between the receivers (2) are at least partly closed.

28. A method in accordance with claim 1, characterized in that the radiation of the transmitters (15) of the transmitter array (130) is transmitted such that, in the total transmission spatial angle (130a), the transmitted radiation is disposed on at least one taking.

29. A method in accordance with claim 1, characterized in that a taking surface formed by the distance picture elements is moved in space by movement of the apparatus as a whole which is attached to a movable carrier (65, 66, 70) and/or relative to the apparatus by means of at least one radiation deflection unit (50).

30. A method in accordance with claim 29, characterized in that the taking surface is movable in space by means of two radiation deflection units (50) whose tilting axis, pivoting axis or axis of rotation extend perpendicular to one another.

31. A method in accordance with claim 29, characterized in that the taking surface is of linear or strip shape and the taking surface is moved in the direction of its longitudinal extent (63) and/or perpendicular (62) thereto.

32. A method in accordance with claim 1, characterized in that predetermined objects are searched for in the taken distance images by means of evaluation software and the objects found are tracked using sequentially taken distance images; and in that a plant (70) is controlled by means of control software in dependence on the results of the object recognition and/or object tracking.

33. A method in accordance with claim 1, used in conjunction with an apparatus for the taking of a large number of distance images comprising distance picture elements having a plurality of transmitters (15) arranged in an array (130) for the transmission of electromagnetic radiation in the form of transmission pulses (14);

a plurality of receivers (2) arranged in an array (125) for the detection of reflected echo pulses (1), wherein an amplifier (3) for the generation of an analog receiver signal (77) containing echo pulses (1) and noise pulses (76) and a device having at least one reference (5) are associated with each receiver (2) with which reference a sequence of logical receiver pulses (79) can be generated from the analog receiver signal (77) which each go back to an echo pulse (1) or noise pulse (76) exceeding the reference (5), with an exceeding of the reference (5) forming the positive flank of the receiver pulse defining an up event (81) and a falling below of the reference forming a negative flank of the receiver pulse defining a down event (82); and a time measuring device disposed after the receiver array (125) for the measurement by determination of the pulse time of flight of the distances of objects which respectively form a distance picture element and at which the transmission pulses (14) are reflected, wherein the time measuring device is configured to carry out a plurality of associated individual measurements for each distance image to be taken, in which in each case a pulse chain (80) is processed which includes a logical start pulse (73) derived from the transmission pulses (14) and at least one logical receiver pulse (79), wherein the time measuring device comprises a device (20) for the formation of the pulse chains (80) which is configured to assemble the logical start pulses (73) and the associated logical receiver pulses (79) in each case at the right time;

an array of time measuring channels which are each made for the processing of logical start pulses (73) and receiver pulses (79);

a device (21) which is made for the distribution of the pulse chains (80) over the time measuring channels in accordance with a predeterminable measurement procedure;

a central clock (33) which provides clock pulses of a known frequency for the time measuring channels;

a device for each time measuring channel which is configured to determine time durations which respectively pass until a receiver pulse (79) and comprises at least one counter (23) which counts in each case at least the clock pulses of the central clock (33) for each up event (81) and/or for each down event (82) which pass, with respect to the logical start pulse (73), until the respective logical receiver pulse (79);

a device with which the count results are stored as an event list in an arrangement taking account of their respective time information; and a device for reading out and evaluating the array of time measuring channels which is configured to convert the time information contained in the event lists into distance values corresponding to the distance picture elements.

34. Use of a method in accordance with claim 1 with an apparatus for the taking of a large number of distance images comprising distance picture elements having a plurality of transmitters (15) arranged in an array (130) for the transmission of electromagnetic radiation in the form of transmission pulses (14);

a plurality of receivers (2) arranged in an array (125) for the detection of reflected echo pulses (1), wherein an amplifier (3) for the generation of an analog receiver signal (77) containing echo pulses (1) and noise pulses (76) and a device having at least one reference (5) are associated with each receiver (2) with which reference a sequence of logical receiver pulses (79) can be generated from the analog receiver signal (77) which each go back to an echo pulse (1) or noise pulse (76) exceeding the reference (5), with an exceeding of the reference (5) forming the positive flank of the receiver pulse defining an up event (81) and a falling below of the reference forming a negative flank of the receiver pulse defining a down event (82); and a time measuring device disposed after the receiver array (125) for the measurement by determination of the pulse time of flight of the distances of objects which respectively form a distance picture element and at which the transmission pulses (14) are reflected, wherein the time measuring device is configured to carry out a plurality of associated individual measurements for each distance image to be taken, in which in each case a pulse chain (80) is processed which includes a logical start pulse (73) derived from the transmission pulse (14) and at least one logical receiver pulse (79), wherein the time measuring device comprises a device (20) for the formation of the pulse chains (80) which is configured to assemble the logical start pulses (73) and the associated receiver pulses (79) in each case at the right time;

an array of time measuring channels which are each made for the processing of the logical start pulses (73) and receiver pulses (79);

a device (21) which is made for the distribution of the pulse chains (80) over the time measuring channels in accordance with a predeterminable measurement procedure;

a central clock (33) which provides clock pulses of a known frequency for the time measuring channels;

a device for each time measuring channel which is configured to determine time durations which respectively pass until a receiver pulse (79) and comprises at least one counter (23) which counts in each case at least the clock pulses of the central clock (33) for each up event (81) and/or for each down event (82) which pass, with respect to the logical start pulse (73), until the respective logical receiver pulse (79);

a device with which the count results are stored as an event list in an arrangement taking account of their respective time information; and a device for reading out and evaluating the event lists of all time measuring channels which is configured to convert the time information contained in the event lists into distance values corresponding to the distance picture elements.

35. A method in accordance with claim 1 when used with an IC module comprising a time measuring device for the carrying out of the method in which at least a plurality of time measuring channels forming an array are integrated, said time measuring device comprising counters (23) for the counting of whole periods of the clock pulses passed until the respective receiver pulse (79);

separators (22) for the formation of part period pulses (84, 87);

delay arrays (24) for the delay of the part period pulses (84, 87);

decoders (25) for the implementation of the number of delay times passed in a part period (85, 88) into information which is in particular binary encoded;

latch arrays for the temporary storage of the encoded information of the decoders (25);

memory regions (26);

an interface (27) associated with the memory regions (26).

36. A method in accordance with claim 1 when used with an apparatus for the taking of a large number of distance images comprising distance picture elements having a plurality of transmitters (15) arranged in an array (130) for the transmission of electromagnetic radiation in the form of transmission pulses (14);

a plurality of receivers (2) arranged in an array (125) for the detection of reflected echo pulses (1), wherein an amplifier (3) for the generation of an analog receiver signal (77) containing echo pulses (1) and noise pulses (76) and a device having at least one reference (5) are associated with each receiver (2) with which reference a sequence of logical receiver pulses (79) can be generated from the analog receiver signal (77) which each go back to an echo pulse (1) or noise pulse (76) exceeding the reference (5), with an exceeding of the reference (5) forming the positive flank of the receiver pulse defining an up event (81) and a falling below of the reference forming a negative flank of the receiver pulse defining a down event (82); and a time measuring device disposed after the receiver array (125) for the measurement by determination of the pulse time of flight of the distances of objects which respectively form a distance picture element and at which the transmission pulses (14) are reflected, wherein the time measuring device is configured to carry out a plurality of associated individual measurements for each distance image to be taken, in which in each case a pulse chain (80) is processed which includes a logical start pulse (73) derived from the transmission pulse (14) and at least one logical receiver pulse (79), wherein the time measuring device comprises a device (20) for the formation of the pulse chains (80) which is configured to assemble the logical start pulses (73) and the associated receiver pulses (79) in each case at the right time;

an array of time measuring channels which are each made for the processing of the logical start pulses (73) and receiver pulses (79);

a device (21) which is made for the distribution of the pulse chains (80) over the time measuring channels in accordance with a predeterminable measurement procedure;

a central clock (33) which provides clock pulses of a known frequency for the time measuring channels;

a device for each time measuring channel which is configured to determine time durations which respectively pass until a receiver pulse (79) and comprises at least one counter (23) which counts in each case at least the clock pulses of the central clock (33) for each up event (81) and/or for each down event (82) which pass, with respect to the logical start pulse (73), until the respective logical receiver pulse (79);

a device with which the count results are stored as an event list in an arrangement taking account of their respective time information; and a device for reading out and evaluating the stored event lists of all time measuring channels which is configured to convert the time information contained in the event lists into distance values corresponding to the distance picture elements, wherein at least a plurality of time measuring channels forming an array are integrated into said apparatus, in particular counters (23) for the counting of whole periods of the clock pulses passed until the respective receiver pulse (79);

separators (22) for the formation of part period pulses (84, 87);

delay arrays (24) for the delay of the part period pulses (84, 87);

decoders (25) for the implementation of the number of delay times passed in a part period (85, 88) into information which is in particular binary encoded;

latch arrays for the temporary storage of the encoded information of the decoders (25);

memory regions (26);

an interface (27) associated with the memory regions (26).

37. An IC module in accordance with claim 35, characterized in that, in addition to the time measuring channels, in each case the device (20) for the formation of the pulse chains (80), the device (21) for the distribution of the pulse chains (80) and/or a device for the time measuring control (29) are integrated at least partly into the IC module (32).

38. An IC module in accordance with claim 36, characterized in that, in addition to the time measuring channels, in each case the device (20) for the formation of the pulse chains (80), the device (21) for the distribution of the pulse chains (80) and/or a device for the time measuring control (29) are integrated at least partly into the IC module (32).

39. An apparatus for the taking of a large number of distance images comprising distance picture elements having a plurality of transmitters (15) arranged in an array (130) for the transmission of electromagnetic radiation in the form of transmission pulses (14);

a plurality of receivers (2) arranged in an array (125) for the detection of reflected echo pulses (1), wherein an amplifier (3) for the generation of an analog receiver signal (77) containing echo pulses (1) and noise pulses (76) and a device having at least one reference (5) are associated with each receiver (2) with which reference a sequence of logical receiver pulses (79) can be generated from the analog receiver signal (77) which each go back to an echo pulse (1) or noise pulse (76) exceeding the reference (5), with an exceeding of the reference (5) forming the positive flank of the receiver pulse defining an up event (81) and a falling below of the reference forming a negative flank of the receiver pulse defining a down event (82); and a time measuring device disposed after the receiver array (125) for the measurement by determination of the pulse time of flight of the distances of objects which respectively form a distance picture element and at which the transmission pulses (14) are reflected, wherein the time measuring device is configured to carry out a plurality of associated individual measurements for each distance image to be taken, in which in each case a pulse chain (80) is processed which includes a logical start pulse (73) derived from the transmission pulses (14) and at least one logical receiver pulse (79), wherein the time measuring device comprises a device (20) for the formation of the pulse chains (80) which is configured to assemble the logical start pulses (73) and the associated logical receiver pulses (79) in each case at the right time;

an array of time measuring channels which are each made for the processing of logical start pulses (73) and receiver pulses (79);

a device (21) which is made for the distribution of the pulse chains (80) over the time measuring channels in accordance with a predeterminable measurement procedure;

a central clock (33) which provides clock pulses of a known frequency for the time measuring channels;

a device for each time measuring channel which is configured to determine time durations which respectively pass until a receiver pulse (79) and comprises at least one counter (23) which counts in each case at least the clock pulses of the central clock (33) for each up event (81) and/or for each down event (82) which pass, with respect to the logical start pulse (73), until the respective logical receiver pulse (79);

a device with which the count results are stored as an event list in an arrangement taking account of their respective time information; and a device for reading out and evaluating the stored event lists of all time measuring channels which is configured to convert the time information contained in the event lists into distance values corresponding to the distance picture elements.

40. An apparatus in accordance with claim 39, characterized in that the references (5) of the devices associated with the receivers (2) are each disposed in the noise so that the logical receiver pulses (79) go back to echo pulses (1) and noise pulses (76), with the devices each comprising at least one comparator (4) or at least one limiting amplifier.

41. An apparatus in accordance with claim 39, characterized in that each time measuring channel is split into two branches, with the one branch being made for the processing of the up events (81) and the other branch being made for the processing of the down events (82).

42. An apparatus in accordance with claim 39, characterized in that the devices for the determination of the time durations are each configured both to count the passed whole periods of the clock pulses and to determine a part period (85, 88) counted too much at the point in time of the up event (81) and/or counted too much at the point in time of the down event (82).

43. An apparatus in accordance with claim 42, characterized in that, for the determination of the part periods (85, 88), the devices each include means for the formation of part period pulses (84, 87), means for the delay of the part period pulses (84, 87) and means for the determination of the width of the part period pulses (84, 87).

44. An apparatus in accordance with claim 43, characterized in that separators (22) are provided for the formation of the part period pulses (84, 87).

45. An apparatus in accordance with claim 42, characterized in that, for the measurement of the part period pulses (84, 87), time to digital converters are provided; and/or in that, for the measurement of the part period pulses (84, 87), delay arrays (24) are provided which include delay elements as well as decoders (25) which are configured to convert count results which each indicate the number of delay times passed in the part period (85, 88) into information which is in particular binary encoded.

46. An apparatus in accordance with claim 45, characterized in that latch arrays are provided which are configured to temporarily store the encoded information of the decoders (25).

47. An apparatus in accordance with claim 39, characterized in that the number of time measuring channels is smaller than the number of receivers (2).

48. An apparatus in accordance with claim 39, characterized in that a device for the measurement procedure control (17) is provided which is configured to control a framework of the time measurement.

49. An apparatus in accordance with claim 39, characterized in that a device for the time measuring control (29) is provided which is configured to control the determination of the time durations in the time measuring channels in dependence on a measurement procedure control (17).

50. An apparatus in accordance with claim 39, characterized in that the time measuring device comprises at least one IC module (32) into which at least a plurality of time measuring channels forming an array are integrated, said time measuring device comprising counters (23) for the counting of whole periods of the clock pulses passed until the respective receiver pulse (79);

separators (22) for the formation of part period pulses (84, 87);

delay arrays (24) for the delay of the part period pulses (84, 87);

decoders (25) for the implementation of the number of delay times passed in a part period (85, 88) into information which is in particular binary encoded;

latch arrays for the temporary storage of the encoded information of the decoders (25);

memory regions (26);

an interface (27) associated with the memory regions (26).

51. An apparatus in accordance with claim 50, characterized in that, in addition to the time measuring channels, in each case the device for the formation of the pulse chains (80), the device for the distribution of the pulse chains (80) and the device for the time measuring control are integrated at least partly into the IC module (32).

52. An apparatus in accordance with claim 50, characterized in that the transmitter array (130), the receiver array (125), a device for the measurement procedure control (17), a device for the group-wise supply of the pulse chains (80) to be processed, the central clock (33) and/or a microprocessor system (28) for the reading out and evaluation of the stored event lists of all time measuring channels are provided separately from the IC module (32).

53. An apparatus in accordance with claim 39, characterized in that the time measuring device is configured to average a plurality of individual measurements originating from the same transmitter/receiver pair and thus relating to the same distance picture element.

54. An apparatus in accordance with claim 39, characterized in that the time measuring device includes a microprocessor (28) which is configured to read out the stored event lists of all time measuring channels and to convert the time information contained in the event lists into distance values corresponding to the distance picture elements.

55. An apparatus in accordance with claim 54, characterized in that the microprocessor (28) is configured to average a plurality of individual measurements originating sequentially from the same transmitter/receiver pair and thus relating to the same distance picture element while using at least one time pattern memory;

integrate the content of the time pattern memory to an amplitude function subsequent to the averaging of the individual measurements;

apply a detection threshold to the amplitude function; and determine the associated object distance in the amplitude function for the echo pulses (1) in each case on the basis of at least one point in time at which the detection threshold is passed through.

56. An apparatus in accordance with claim 39, characterized in that the transmitters (15) of the transmitter array (130) are each configured and arranged such that the transmitted radiation is projected at an individual transmission spatial angle (131*a*) and the individual transmission spatial angles (131*a*) combine to form a total transmission spatial angle (130*a*); and in that the receivers (2) of the receiver array (125) are each configured and arranged such that the reflected radiation from a single reception spatial angle (126*a*) is received and the individual reception spatial angles (126*a*) combine to form a total reception spatial angle (125*a*), with the total reception spatial angle (125*a*) including the total transmission spatial angle (130*a*) and with mutually distinguishable overlaps of the individual reception spatial angles (126*a*) and individual transmission spatial angles (131*a*) being present, with each overlap corresponding to a distance picture element.

57. An apparatus in accordance with claim 56, characterized in that the projected radiation of the transmitters (15) of the transmitter array (130) lies on at least one line in the total transmission spatial angle (130*a*).

58. An apparatus in accordance with claim 39, characterized in that the transmitters (15) of the transmitter array (130), in particular the active transmission surfaces (131) of the transmitters (15) preferably formed by laser diodes (10), lie on at least one line.

59. An apparatus in accordance with claim 39, characterized in that the receivers (2) of the receiver array (125), in particular the active detection surfaces (126) of the receivers (2) preferably formed by photodiodes, lie on at least one line.

60. An apparatus in accordance with claim 39, characterized in that the transmitter array (130) and/or the receiver array (125) each include an optical projection system (47, 48) which images the respective active surfaces (131, 126) in the distance field.

61. An apparatus in accordance with claim 39, characterized in that a shadow mask (134) is disposed in front of the receiver array (125) with which the receivers (2), in particular the active detection surfaces (126) of the receivers (2), can be insulated from one another.

62. An apparatus in accordance with claim 61, characterized in that the shadow mask (134) is applied directly to the receiver array (125) or is arranged at a spacing from the receiver array (125).

63. An apparatus in accordance with claim 61, characterized in that the shadow mask (134) is arranged in the focal plane of an optical projection system (48) of the receivers (2).

64. An apparatus in accordance with claim 39, characterized in that the transmitter array (130) and/or the receiver array (125) include a plurality of partial arrays and at least one shadow mask (134) is provided for the assembling of the partial arrays, said shadow mask being configured and arranged such that gaps (128, 133) present between the transmitters (15) and/or between the receivers (2) are at least partly closed.

65. An apparatus in accordance with claim 39, characterized in that at least one radiation deflection unit (50) which can be tilted, pivoted or rotated around at least one axis is provided to move the taking line in space, with in particular the radiation deflection unit (50) including at least one deflection mirror (51).

66. An apparatus in accordance with claim 65, characterized in that two radiation deflection units (50) which can be tilted, pivoted or rotated are provided whose axes extend perpendicular to one another.

67. An apparatus in accordance with claim 39, characterized in that the device (21), which is configured to distribute the pulse chains (80) formed for each distance image to be taken onto the array of time measuring channels in accordance with a predeterminable measurement procedure, is operable in at least one of the following measurement modes, preferably selectable in each of them:
  (i) a pulse chain (80) can be processed in parallel in a plurality of time measuring channels, with preferably a device being provided with which the clock pulses of the central clock (33) can be supplied to the time measuring channels in a phase shifted manner;
  (ii) a plurality of individual measurements originating from the same transmitter/receiver pair and thus relating to the same distance picture element can be processed together like an individual measurement (so-called "burst" measurement).

* * * * *